(12) United States Patent
Roys

(10) Patent No.: US 8,561,477 B2
(45) Date of Patent: Oct. 22, 2013

(54) FLUID FLOW MONITOR AND CONTROL SYSTEM

(75) Inventor: Curtis Roys, Midland, TX (US)

(73) Assignee: Coltec Industrial Products LLC, Charlotte, NC (US)

( * ) Notice: Subject to any disclaimer, the term of this patent is extended or adjusted under 35 U.S.C. 154(b) by 217 days.

(21) Appl. No.: 13/115,737

(22) Filed: May 25, 2011

(65) Prior Publication Data

US 2011/0231114 A1  Sep. 22, 2011

Related U.S. Application Data

(63) Continuation of application No. 12/759,468, filed on Apr. 13, 2010, now Pat. No. 7,970,558, which is a continuation of application No. 11/003,932, filed on Dec. 3, 2004, now Pat. No. 7,720,574, which is a continuation of application No. 10/402,205, filed on Mar. 26, 2003, now Pat. No. 6,850,849, which is a continuation of application No. 10/383,920, filed on Mar. 7, 2003, now abandoned, which is a continuation-in-part of application No. 10/176,385, filed on Jun. 20, 2002, now Pat. No. 6,823,270.

(60) Provisional application No. 60/299,851, filed on Jun. 20, 2001.

(51) Int. Cl.
    *G01F 1/56* (2006.01)
    *G06F 19/00* (2011.01)

(52) U.S. Cl.
    USPC .......................... 73/861.08; 700/282; 702/45

(58) Field of Classification Search
    USPC ........ 700/281, 282, 283; 137/2, 551; 73/1.16, 73/1.73, 53.04, 149, 861, 861.08; 184/1.5, 184/6.1, 6.4, 7.4, 108
    See application file for complete search history.

(56) References Cited

U.S. PATENT DOCUMENTS

| | | |
|---|---|---|
| 3,564,277 A | 2/1971 | Maguire |
| 4,043,198 A | 8/1977 | Stillwell et al. |
| 4,228,924 A | 10/1980 | Gilbert |
| 4,419,880 A | 12/1983 | Hanowich |
| 4,445,168 A | 4/1984 | Petryszyn |
| 4,521,895 A | 6/1985 | Wells |
| 4,536,660 A | 8/1985 | Tetro |
| 4,674,030 A | 6/1987 | Gabriel et al. |
| 4,811,001 A | 3/1989 | Sweany |
| 4,844,506 A | 7/1989 | Moriguchi et al. |

(Continued)

FOREIGN PATENT DOCUMENTS

EP   0657245   6/1995

*Primary Examiner* — Charles Kasenge
(74) *Attorney, Agent, or Firm* — Perkins Coie LLP

(57) ABSTRACT

A fluid flow monitoring system including one or more fluid flow dispensing valves each including a piston. Fluid flow sensors are associated with the fluid flow dispensing valves for measuring fluid flow. The fluid flow sensors include a housing with a magnet positioned therein and a piston follower is coupled to the magnet. The piston follower includes a shoulder portion positioned within the housing. A spring is operative to bias the magnet and piston follower towards the piston during operation so that piston movement is transmitted to the magnet. The housing includes a retainer portion disposed on the housing that confronts the shoulder portion of the piston follower whereby the magnet, piston follower, and spring are retained within the housing. The system also includes a fluid flow monitor that includes a microprocessor programmed to convert cycle signals from the sensors to fluid flow information.

19 Claims, 21 Drawing Sheets

(56) References Cited

U.S. PATENT DOCUMENTS

| | | |
|---|---|---|
| 4,858,645 A | 8/1989 | Reeves |
| 4,908,154 A | 3/1990 | Cook et al. |
| 5,182,720 A | 1/1993 | Beck et al. |
| 5,198,115 A | 3/1993 | Stalling et al. |
| 5,228,469 A * | 7/1993 | Otten et al. ............ 137/80 |
| 5,381,926 A * | 1/1995 | Credle et al. ............ 222/1 |
| 5,461,903 A * | 10/1995 | Harms ............ 73/40 |
| 5,558,126 A | 9/1996 | Hayashi et al. |
| 5,562,181 A | 10/1996 | Elkin et al. |
| 5,565,770 A | 10/1996 | Jones |
| 5,612,890 A | 3/1997 | Strasser et al. |
| 5,664,492 A | 9/1997 | Bendzick |
| 5,698,117 A | 12/1997 | Doutt |
| 5,738,498 A | 4/1998 | Allington et al. |
| 5,755,559 A | 5/1998 | Allington et al. |
| 5,835,372 A | 11/1998 | Roys et al. |
| 5,863,186 A | 1/1999 | Green et al. |
| 5,882,384 A | 3/1999 | Tom et al. |
| 5,914,082 A | 6/1999 | Harrison |
| 5,926,018 A | 7/1999 | Jones |
| 6,012,021 A | 1/2000 | Rombach et al. |
| 6,016,055 A | 1/2000 | Jager et al. |
| 6,060,881 A | 5/2000 | Dilger et al. |
| 6,087,827 A | 7/2000 | Oudet |
| 6,114,823 A | 9/2000 | Doner et al. |
| 6,123,174 A | 9/2000 | Elkin et al. |
| 6,147,010 A | 11/2000 | Whitman |
| 6,152,172 A | 11/2000 | Christianson et al. |
| 6,160,395 A | 12/2000 | Goetz et al. |
| 6,175,233 B1 | 1/2001 | McCurley et al. |
| 6,211,668 B1 | 4/2001 | Duesler et al. |
| 6,212,958 B1 | 4/2001 | Conley |
| 6,215,299 B1 | 4/2001 | Reynolds et al. |
| 6,234,201 B1 | 5/2001 | Strobel |
| 6,292,758 B1 | 9/2001 | Gilbert et al. |
| 6,295,810 B1 | 10/2001 | Langen et al. |
| 6,319,410 B1 | 11/2001 | Allington et al. |
| 6,336,362 B1 | 1/2002 | Duenas |
| 6,382,595 B1 | 5/2002 | Nold, III |
| 6,405,810 B1 | 6/2002 | Grach et al. |
| 6,453,257 B1 | 9/2002 | Juhasz |
| 6,464,799 B1 | 10/2002 | Lerner et al. |
| 6,476,600 B2 | 11/2002 | Kono et al. |
| 6,507,189 B2 | 1/2003 | Woolsey et al. |
| 6,514,569 B1 | 2/2003 | Crouch |
| 6,520,202 B2 | 2/2003 | Miyazoe et al. |
| 6,678,255 B1 | 1/2004 | Kuriyan |
| 6,726,091 B1 | 4/2004 | Ehrick et al. |
| 6,779,558 B1 | 8/2004 | Bruck et al. |
| 6,823,270 B1 | 11/2004 | Roys |
| 6,829,542 B1 | 12/2004 | Reynolds et al. |
| 6,850,849 B1 | 2/2005 | Roys |
| 6,882,960 B2 | 4/2005 | Miller |

* cited by examiner

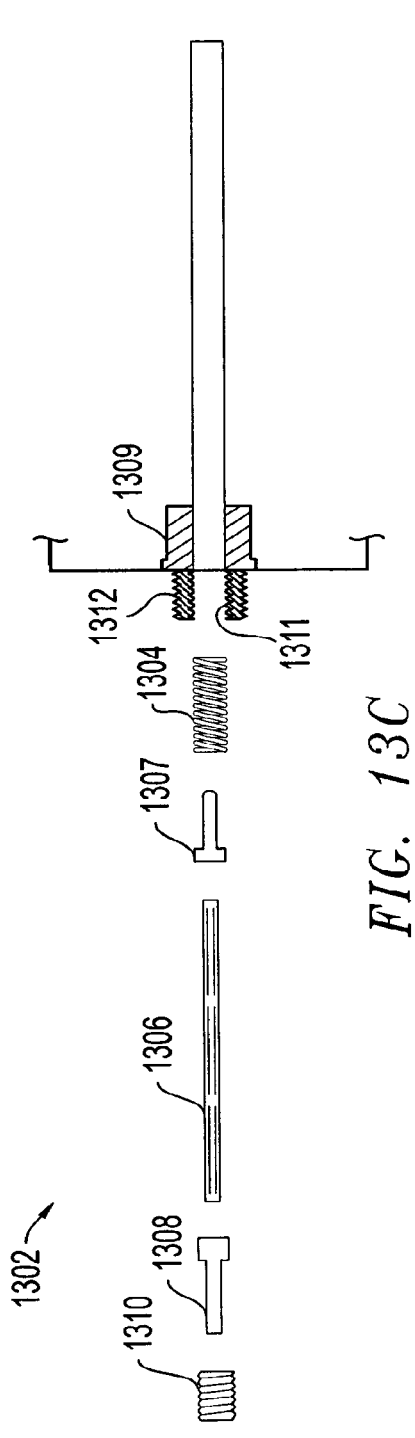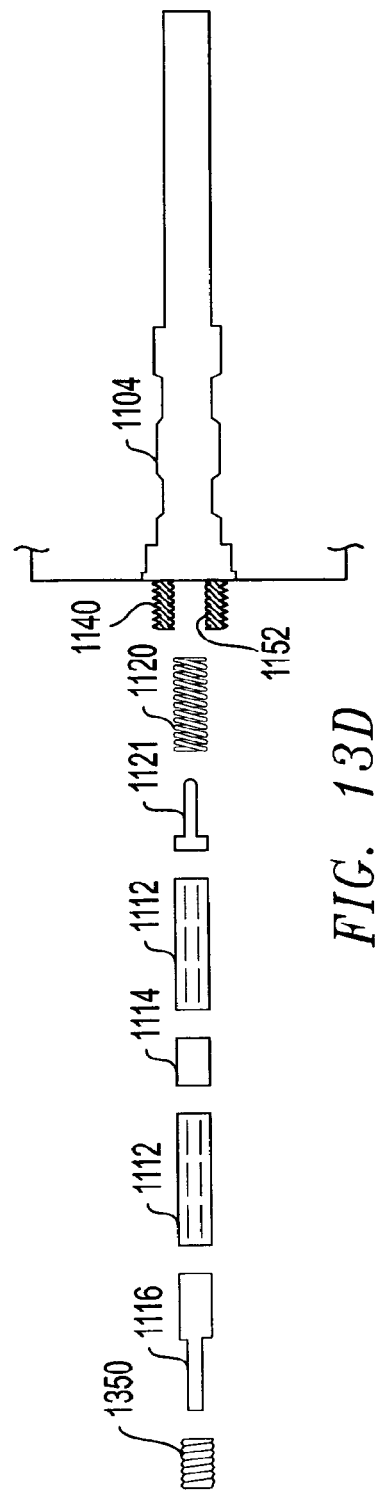

FLUID FLOW MONITOR AND CONTROL SYSTEM

RELATED APPLICATIONS

This application is a continuation of U.S. patent application Ser. No. 12/759,468, filed Apr. 13, 2010, which is a continuation of U.S. patent application Ser. No. 11/003,932, filed Dec. 3, 2004, and now issued as U.S. Pat. No. 7,720,574, which is a continuation of U.S. patent application Ser. No. 10/402,205, filed Mar. 26, 2003, and now issued as U.S. Pat. No. 6,850,849, which is a continuation of U.S. patent application Ser. No. 10/383,920, filed Mar. 7, 2003, and now abandoned, which is a continuation-in-part of U.S. patent application Ser. No. 10/176,385, filed Jun. 20, 2002, and now issued as U.S. Pat. No. 6,823,270, which claims priority from U.S. Provisional Pat. App. No. 60/299,851, filed Jun. 20, 2001, all of which are incorporated by reference.

TECHNICAL FIELD OF THE INVENTION

The present invention relates to the field of fluid flow monitoring, analysis, and control and, in particular, to methods and apparatuses for integrated monitoring, analysis, and control of low volume, high pressure fluid flow systems.

BACKGROUND OF THE INVENTION

A variety of fluids, such as lubricants and chemical reactants, are used in modern industry. For example, compressors and other machines reduce internal friction between parts by injecting a lubricant, such as oil or grease, into critical bearing surfaces and reciprocating part junctions. If the flow of lubricant is interrupted, compressors and other industrial tools can be seriously damaged or destroyed. On the other hand, too much lubricant can unnecessarily increase the operating expenses of the machinery and can contaminate the environment. Poorly controlled fluid flow can affect the result in other industrial operations, such as well bore components, gas pipeline components, and oil and gas production.

A variety of systems are used to distribute lubrication in industrial machine applications. Originally, multiple pumps were used to supply oil to multiple points. It was found that, in such systems, the flow was not sufficiently uniform between lubrication points, with some points being starved for lubricant while other points wasted lubricant with excessive flow.

A more reliable system uses a pump to pressurize a fluid distribution line and a positive displacement divider block, also referred to as a divider valve, to distribute a lubricant, such as oil, from the single pump outlet line to multiple injection points. A typical divider block is operated by the pressure of the incoming fluid to divide the fluid into multiple output channels. Divider blocks typically include multiple internal pistons that are activated by the flow of the incoming oil. As the oil moves the pistons, internal hydraulic circuits open and close to distribute a known volume of lubricant to each of the multiple outputs for each cycle of the pistons. Because the internal hydraulic circuits are progressively opened and closed by the flow of the incoming oil, no external power source is required to operate the divider block, and no external timing signal is required to deliver a prescribed amount of oil to each outlet line. The bore and stroke of each piston determines the amount of fluid delivered with each cycle of the divider block. Because these dimensions are known, the amount of oil distributed for each cycle of the divider block can be readily calculated, and if the number of cycles in a unit of time is tracked, the flow rate can be readily determined. The simplicity and reliability of divider blocks have lead to their wide acceptance in many applications.

Divider blocks can still fail to provide adequate lubrication in some circumstances. For example, a pump failure can reduce the inlet flow to the divider block, reducing the amount of lubricant distributed. The divider block can become clogged, jammed, or sufficiently worn so as to reduce fluid or lubrication flow to specific points.

U.S. Pat. No. 5,835,372 to Roys et al. for an "Integrated Fluid Flow Evaluation Apparatus and Method," which is hereby incorporated by reference, describes a system for monitoring the cycles of the outputs of a divider block. In accordance with the Roys et al. patent, a fluid flow sensor can be mounted at an outlet position of a divider block to detect cycles of the combined outlets. The sensor includes a magnet, typically mounted on a rod coupled mechanically or magnetically to the piston. The magnet moves back and forth as the piston moves. A reed switch positioned along the path of the magnet is operated as the magnet passes, so each signal from the reed switch corresponds to a cycle of that dispensing valve piston. Knowing the bore and stroke of the piston, the system can determine the lubricant flow rate, e.g., the number of pints per day, at an outlet by counting how many times the reed switch closes during a measured time period. For example, if the piston expels 10 cc of lubricant with each cycle and the reed switch closes three times each minute, a lubricant flow of 30 cc/min should pass through that outlet of the divider block. Since all pistons of a divider block go through one complete dispense process during each period that the valve cycles, a user typically connects a single sensor to one outlet of the divider block to count valve cycles, and then infers the fluid flow from all the outlets.

A fluid flow monitor associated with the sensor includes a microprocessor that counts reed switch activations and a display mounted on the monitor to provide control information to field personnel. The monitor can also send a signal to shut down the lubricated equipment if the flow of lubricant is below a minimum level. Although stored data is primarily viewed in the field by maintenance personnel, the monitor can be connected to a central control panel.

While the system of Roys et al. displays some control information at each divider block, a field service technician is typically required to read the information from each monitor display to check the status and history of that individual block. Although a "hard-wired" control panel near the divider block can be used to collect data from multiple sensors, running wires adds to the cost of installation and may be difficult or impossible in some situations, such as in areas containing explosive gases or at long distances from the control panel. In many applications a field maintenance operator cannot electrically download information from a monitor onsite, because in an explosive hazard environment, it is forbidden to make or break electrical connections because of the possibility of causing a spark.

Also, although the Roys et al. system provided information about the fluid that exited the divider block, it provides no information about whether the fluid actually reached the injection point. Thus, leaks between the divider block and the injection point can go undetected.

Relatively small volume fluid flow is not typically measured in-line because of a lack of cost-effective measuring equipment. Turbine-type measurement devices are used in fluid systems having a high volume of fluid flow, for example, measured in gallons per minute or liters per minute. Turbine devices are not suitable for measuring low volume, that is, in the range of about ten gallons or less per day. Such low volumes are typically pumped by lubrication and chemical pumps. Positive displacement pump-type measuring systems typically use gears and are typically expensive and cannot accurately measure low volumes. Such devices are impractical to use in large numbers to monitor fluid flow at the large number of points necessary to characterize fluid flow in a large system and they are typically not sufficiently accurate at low volumes. Accurate measurement of the flow of relatively small amounts of fluid at the relatively high pressure used in some systems has been a problem in the industry.

In the oil and gas industry, the amount of fluid used in many circumstances is determined by observing a "draw down" gauge at a tank. Such gauges are not precise, and while such gauges indicate the amount of fluid that left the tank, they do not directly measure the fluid that was applied at the injection point. Leaks or wrongly set valves may prevent fluid that left the tank from arriving at its intended injection point. The lack of a practical method of monitoring the divider block for measurement, trending and control of fluid.

The accuracy of fluid flow measurement based on a cycle counter on a divider block can decrease over time. As the divider block wears over hundreds of thousands or millions of cycles, the amount of fluid delivered for each cycle of the piston can vary, with some of the fluid bypassing the piston and traveling to a point of least resistance. Then, some lubricant flows back around the piston instead of being forced into the outlet, and the flow calculations based on the piston size to each lubrication point or fluid injection point become inaccurate.

U.S. Pat. No. 6,212,958 to Conley describes the use of a blade that extends into the pipe and the degree of deflection of the blade as fluid flows is an indication of fluid flow. Extending a blade into the fluid can affect the fluid flow and the blade can deteriorate over time.

Another solution to measuring fluid flow has been to use a thermistor to infer fluid flow based upon a change in temperature. This method is only for monitoring movement of fluid and cannot monitor in quantity of fluid. Such units are expensive, are impractical to attach to a large number of fluid flow points to accurately monitor and characterize a large system and are not permitted in areas where explosive gases or vapors are present. There are sometimes disagreements between suppliers and users about the amount of fluid that has been delivered.

When fluid flow is monitored, using the devices described above, the information available has been limited primarily to current flow and has been used primary to shut down equipment or to sound an alarm. This information is typically inadequate for precise monitoring. For example, when a single compressor in a multiple compressor system fails, it would be difficult to detect that the failure was caused by an intermittent lubrication problem, particularly if the lubrication system was functioning adequately at the time of failure. Service personnel would likely observe that the other compressors are satisfactory and determine that the lubrication system is operating properly and assume that the fault was in the compressor itself. In fact, the lubrication system may be operating properly at the time the technician observes the system, but a previous undetected problem may have damaged the compressor to the point where it fails later, when it is receiving adequate lubrication. Thus, it has been very difficult to diagnose some lubrication problems and such problems cost industry a great deal in ruined equipment.

SUMMARY OF THE INVENTION

An object of the invention is to provide a method and apparatus for monitoring and controlling fluid flow so as to detect and correct inadequate or excessive flow and thereby minimize damage to machinery and the environment and reduce operational cost.

The present invention comprises a system for monitoring, analyzing, and controlling fluid flow. In one embodiment, the system comprises one or more fluid flow monitors that determine fluid flow from cycle counts from one or more fluid flow sensors attached to dispensing valves. The dispensing valves can distribute fluid to multiple output channels, that is, the dispensing valve can be a divider valve, or the dispensing valves can distribute fluid to a single output channel. A single output dispensing valve and an associated sensor can be used to measure and display average valve cycle time or fluid flow within a hydraulic channel, such as at an injection point. A fluid flow monitor can be mounted directly on the dispensing valve or be positioned away from the dispensing valve and accept remote input by wire or radio frequency link from a fluid flow sensor that is mounted on a dispensing valve. The fluid flow monitor system can store fluid flow information, which can be downloaded, for example, by an infrared link, to a personal digital assistant or a personal computer. The fluid flow monitor system can also output a signal to a pump control device to adjust the pump if the fluid flow is not within specified guidelines. The fluid flow monitor system could also output a local alarm signal or a machine shutdown signal when comparison of the fluid flow with programmed parameters indicates a problem. Data from the fluid flow monitor or cycle information from fluid flow sensors can be transmitted via a satellite radio link to a server computer for transmitting over or posting on the Internet, allowing the data to be accessed at locations remote from the location of the fluid flow monitor, In some embodiments, measured fluid flow values can be compared with desired fluid flow values and adjustments can be made from any point in the world with access to the Internet, automatically or by manual data entry, to a pump to bring measured values close to desired values.

Another aspect of the inventive system includes the use of a Hall effect sensor to detect motion of a piston follower in a fluid flow sensor, Another aspect of the invention entails the ability to download data from a fluid flow monitor using an infrared link, thereby allowing information to be downloaded in a safe manner in an explosive environment without having to hard wire connections to the monitor.

Another aspect of the invention includes the ability to convert fluid flow data from a personal digital assistant data format to a format that is useable in commercially available software, such as spreadsheets and databases, suitable for analyzing information.

Another aspect of the inventive system is a fluid flow sensor in which the magnet and spring assembly is constrained within a housing when the sensor is not connected to the dispensing valve, thereby preventing these components from falling out when the sensor is installed or removed.

Another aspect of the invention provides a feedback loop between the fluid measuring device and a fluid pump, so that the fluid pump can be adjusted to increase or decrease the fluid flow, thereby preventing excess fluid flow, which can, for example, waste resources, and preventing insufficient fluid flow, which can, for example, damage equipment for lack of adequate lubrication.

The foregoing has outlined rather broadly the features and technical advantages of the present invention in order that the detailed description of the invention that follows may be better understood. The system as described herein includes several inventive aspects, and not all embodiments will include all the features described. Moreover, it should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which:

FIG. 13C is an exploded view of the components of the fluid flow sensor of FIG. 13A. FIG. 13D is an exploded view of the components of a fluid flow sensor similar to that of FIG. 13A, but using a Hall effect sensor instead of a reed switch.

DETAILED DESCRIPTION OF THE PREFERRED EMBODIMENTS

Figure 1:
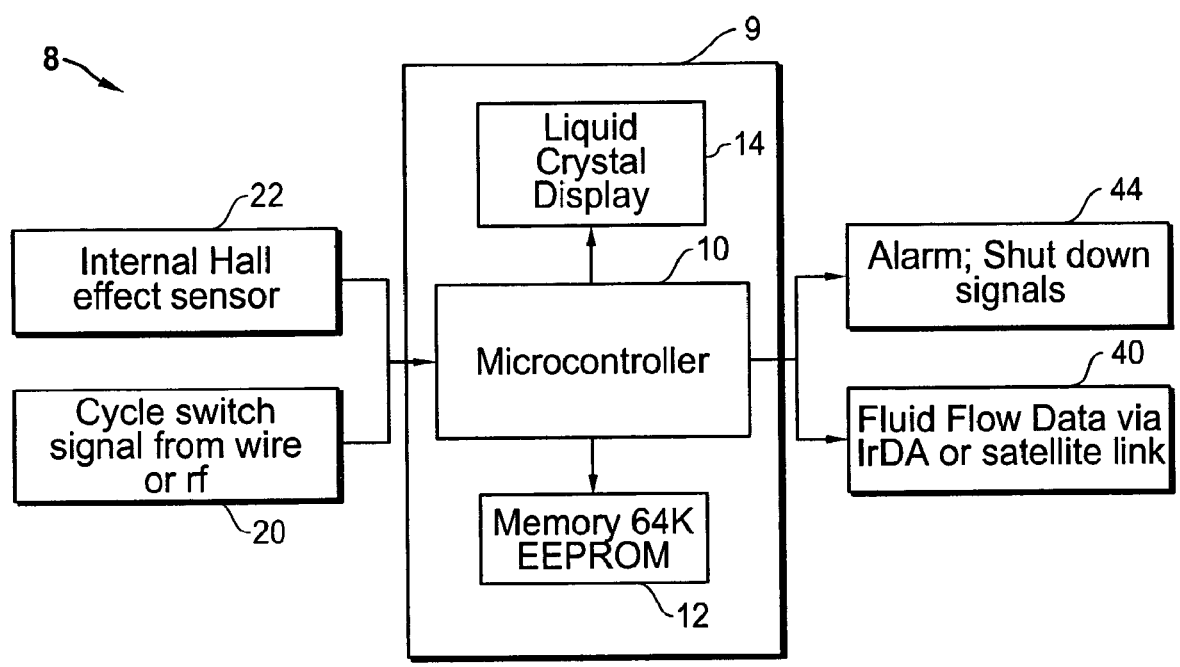
FIG. 1 is a block diagram of a preferred fluid flow evaluation system.

FIG. 1 shows a block diagram of a preferred fluid flow evaluation system 8. Fluid flow evaluation system 8 includes a fluid flow monitor 9, such the Proflo® fluid flow monitor from C.C. Technology, Inc., Midland, Tex., the assignee of the present invention. Fluid flow monitor 9 includes a microcontroller 10, such as a Hitachi H8/3847 microcontroller, a memory 12, such as a 64 k EEPROM, and an output display 14, such as a liquid crystal display.

Microcontroller 10 accepts input signals from a fluid flow sensor, the input signals corresponding to piston cycles. A fluid flow sensor 22 can be located within fluid flow monitor 9. That is, the fluid flow monitor 9 can be mounted directly on a dispensing valve, and the internal fluid flow sensor detects the movement of a magnet that is moved by a dispensing valve piston. Alternatively, fluid flow monitor 9 can be mounted remotely from the dispensing valve being measured, and fluid flow monitor 9 can accept piston cycles signals transmitted via wire or radio frequency wireless link from a separate fluid flow sensor mounted on the dispensing valve.

The piston cycle signal received from the fluid flow sensor 20 or 22 is combined by the fluid flow monitor 9 with clock signals and information about the amount of fluid flow per valve cycle to determine a flow rate of fluid. Different information can be stored in memory 12 depending upon user requirements. For example, memory 12 can store individual cycle times, average cycles for a predetermined period, or some combination of individual readings and average. Memory 12 preferably stores at least twelve months of operational data.

In a fluid flow sensor mounted on a dispensing valve, a magnet is linked, mechanically, magnetically, or otherwise, with a piston of the dispensing valve. As the dispensing valve cycles, the moving magnet provides a magnetic "pulse," which is detected by a reed switch or Hall effect sensor switch in the fluid flow monitor. A Hall effect sensor emits a low level signal that is detected and counted by the microcontroller in the fluid flow monitor. The Hall effect sensor switch has no moving parts and so will not wear out and will not be readily destroyed by vibration. The fluid flow monitor 9 preferably can output an alarm signal 44 and information 40 about valve cycles that correlate to fluid flow. The fluid flow monitor can also preferably shut down the compressor if lubrication is inadequate.

The output 40 from the fluid flow monitor can be through a wire, through an infrared link, such as an IrDA (Infra red data associate) link, or through a radio frequency satellite link using, for example, the RS 485 standard. Fluid flow monitors are often located in areas of extreme explosion hazard, such as around explosive chemicals or natural gas. In such environments, connecting or disconnecting electrical circuits presents an extreme hazard because of the risk of generating a spark. By using an infra-red link, the present invention allows a person to download fluid flow data in a safe manner in an explosive environment. Although the data could also be downloaded by hard-wired electrical connections, such connections are more costly to provide, particularly to retrofit into existing equipment.

Different information can be output differently from the same fluid flow monitor. For example, an alarm signal or a shut-down signal 44 may be output along a wire to a control panel, whereas fluid flow trend information may be output through the infrared link to a hand-held computer or through a radio frequency satellite link. If a satellite or telephone link is used, the information can then be automatically made available through the Internet to equipment owners and operators anywhere in the world. Alarm conditions can be relayed to designated individuals via paging, telephone, e-mail, instant messaging, web site posting or other Internet or non-Internet notification.

Figure 2:
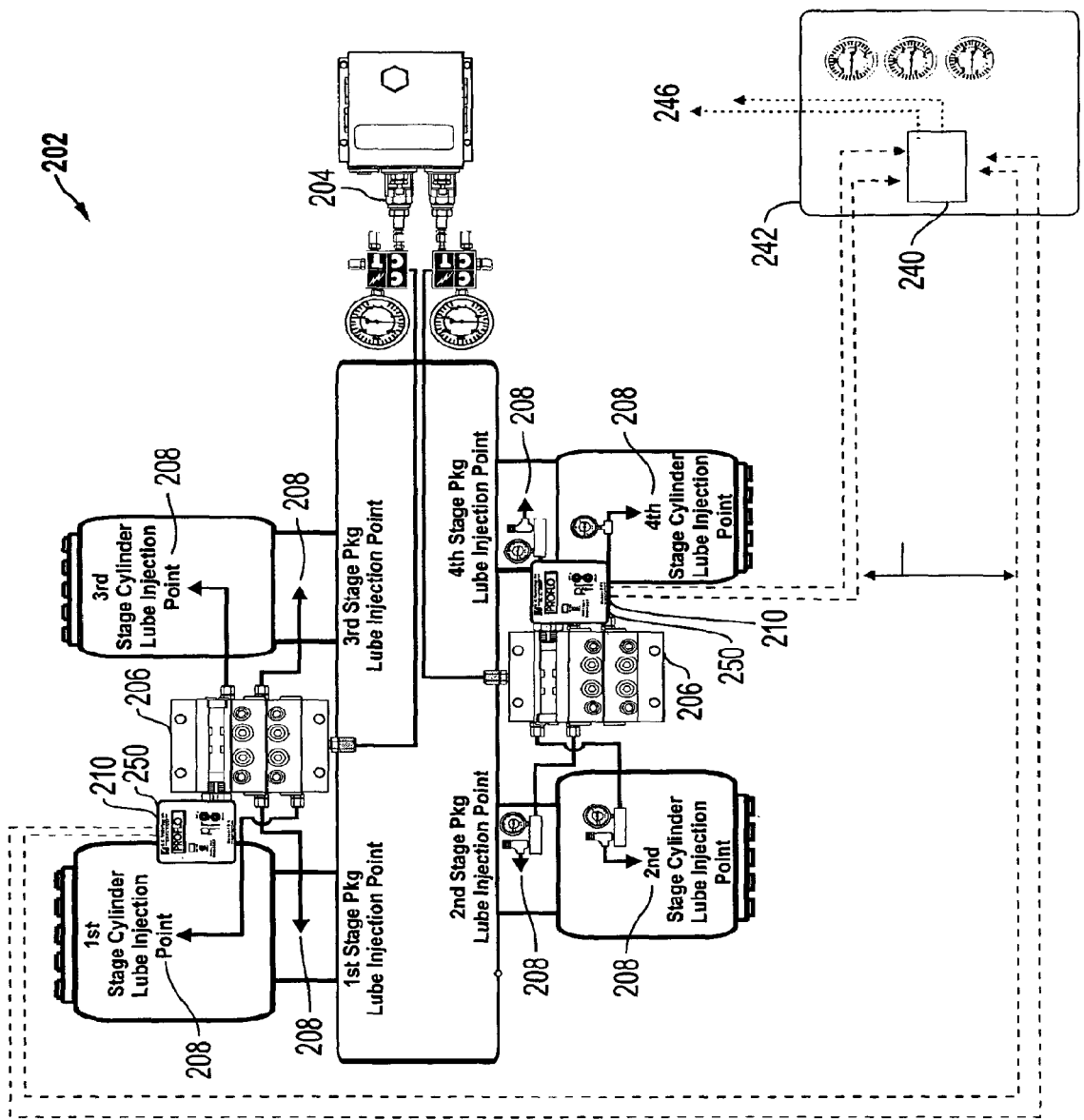
FIG. 2 shows a multistage compressor having two fluid flow monitors each mounted directly on a dispensing valve and each capable of transmitting flow information through an infrared link, and alarm and shut-down information via wire to a local control panel and then optionally through a satellite link to the Internet.

FIG. 2 show a multistage compressor 202 lubricated by a fluid delivered from a fluid pump 204 to two dispensing valves 206. Each of dispensing valves 206 dispenses lubricating fluid to multiple lubrication four injection points 208 on the compressor 202. Attached to at least one output of each of the valves dispensing 206 is a fluid flow monitor 210. Each fluid flow monitor 210 includes an internal cycle switch, such as a Hall effect sensor or a reed switch, that is activated by a magnet that moves in coordination with the corresponding piston (not shown) within dispensing valves 206. The cycle switch provides indication signals that are combined by microprocessor 10 with timing signals to determine fluid flow information, which is stored in memory 12.

The fluid flow monitor system of FIG. 2 is also wired to an alarm 240 on a control panel 242 to provide an alarm signal when a programmable alarm condition, such as an inadequate or excessive lubrication flow, are encountered. A shut down signal can also be transmitted to the control panel 242 to shut down compressor 202 if the fluid flow level could damage the compressor. An alarm signal can also be transmitted from the control panel 242 via satellite link 246 to a network server that makes the alarm available to a user over the World Wide Web or other computer network.

Information about fluid flow can be downloaded from the fluid flow monitors on the dispensing valves by an infrared link 250 to a portable computing device, such as a personal digital assistance (PDA), for example, a Palm Pilot or Handspring Visor. A personal digital assistance may be usable in an explosion-rated environment because of the low battery voltage, whereas a notebook or laptop computer may not be prohibited. Moreover, using an infrared link to download information eliminates the need to make a temporary electrical connection between the computing device and the fluid flow monitor 210, thereby allowing data to be transferred in an explosion-rated environment where such connections are prohibited. The system of FIG. 2 allows the operator to easily and immediately begin protecting and monitoring the fluid flow in the system.

Figure 3A:
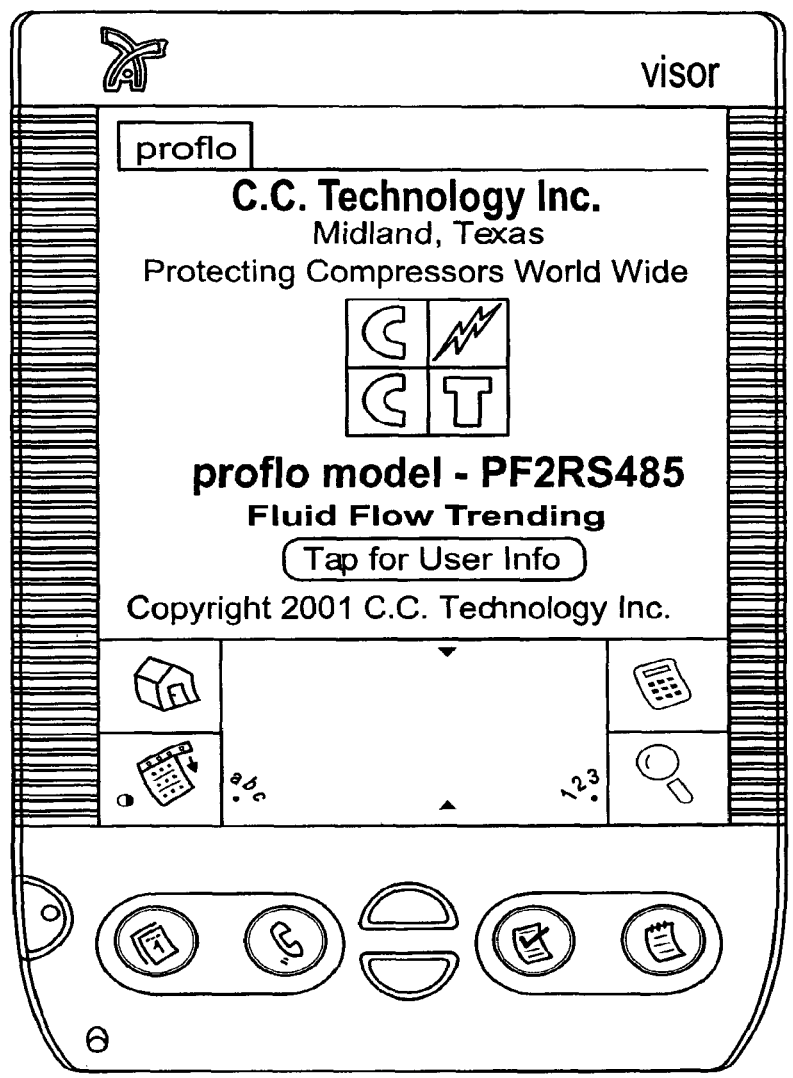
FIGS. 3A-3H are typical input screen images from a personal digital assistance that interfaces with a fluid flow monitor.
Figure 3B:
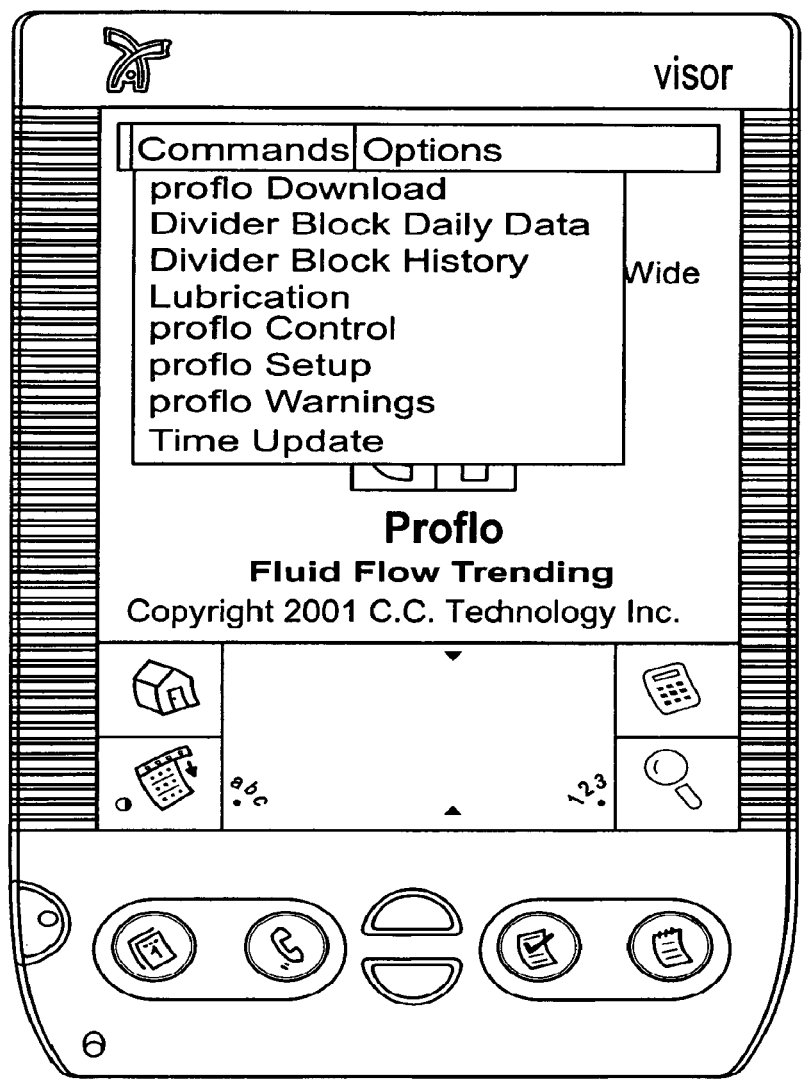
Figure 3C:
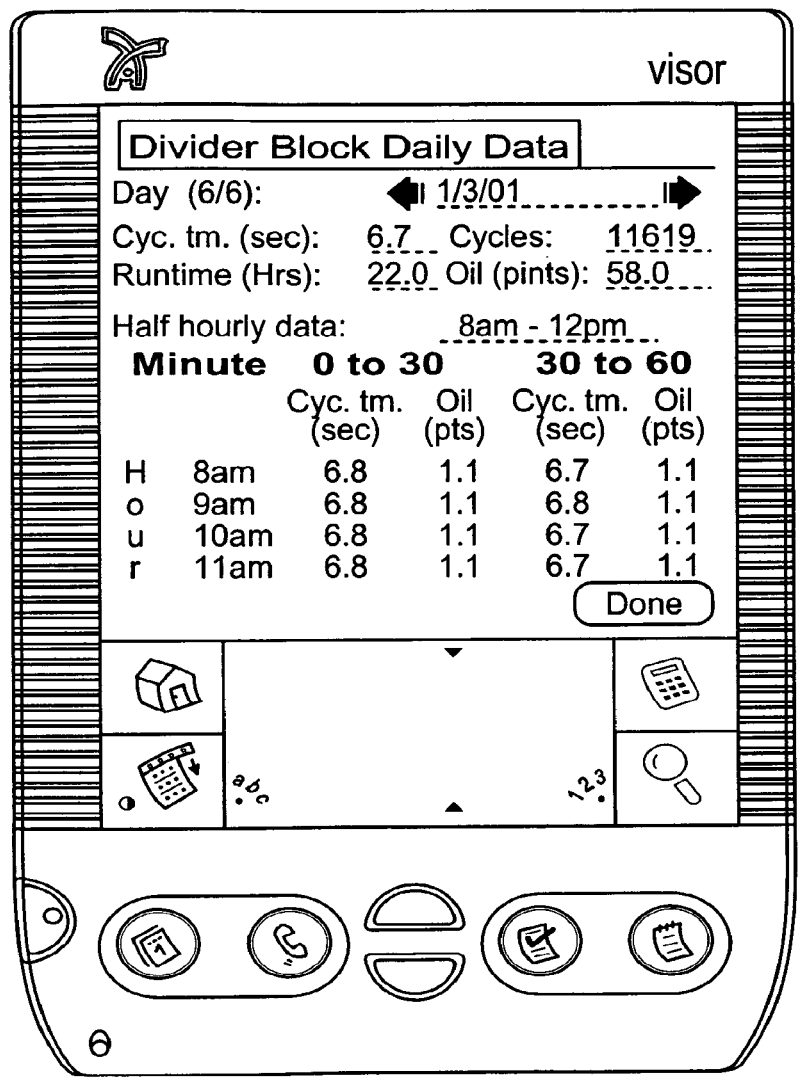

FIGS. 3A-3H are examples of screens displayed on a PDA for characterizing fluid flow. FIG. 3A shows an opening screen when displayed the fluid control application is begun. FIG. 3B shows the applications that are available from a pull-down command menu. FIG. 3C shows divider block data that is displayed when "Divider Block Daily Data" is selected from Command menu. The Divider Block Daily Data screen displays, for each hour period during the day, the average cycle time for the divider clock and the amount of lubricant injected.

Figure 3D:
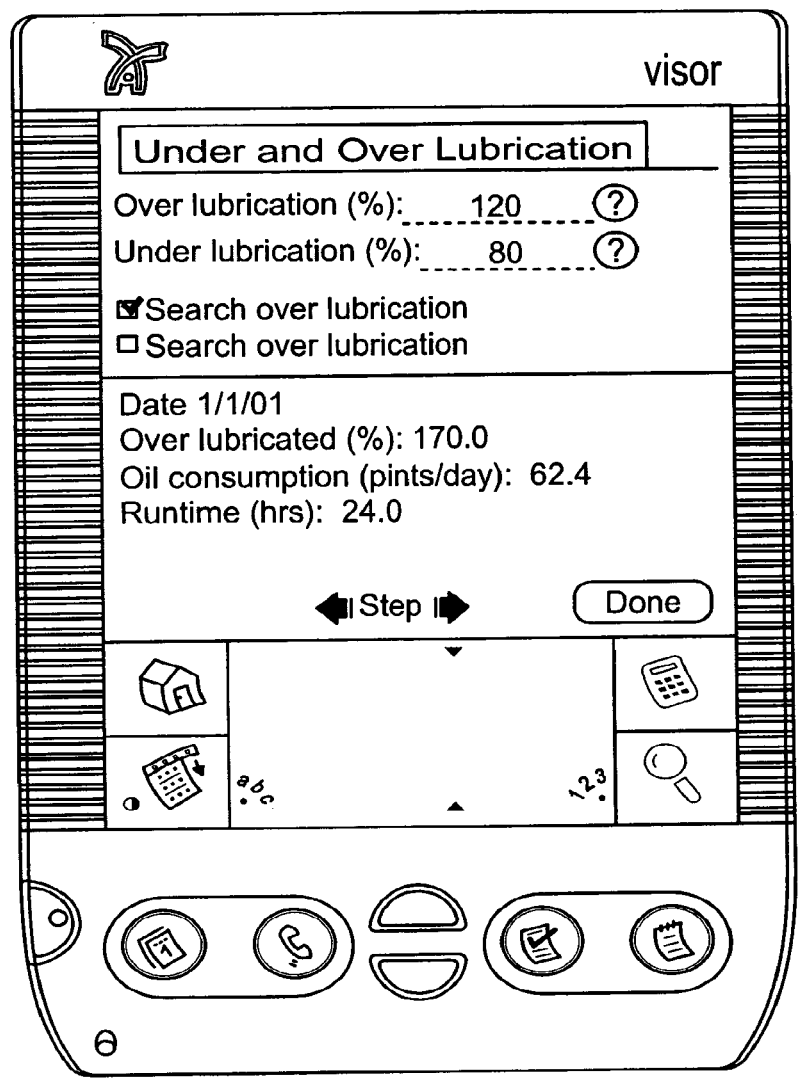
Figure 3E:
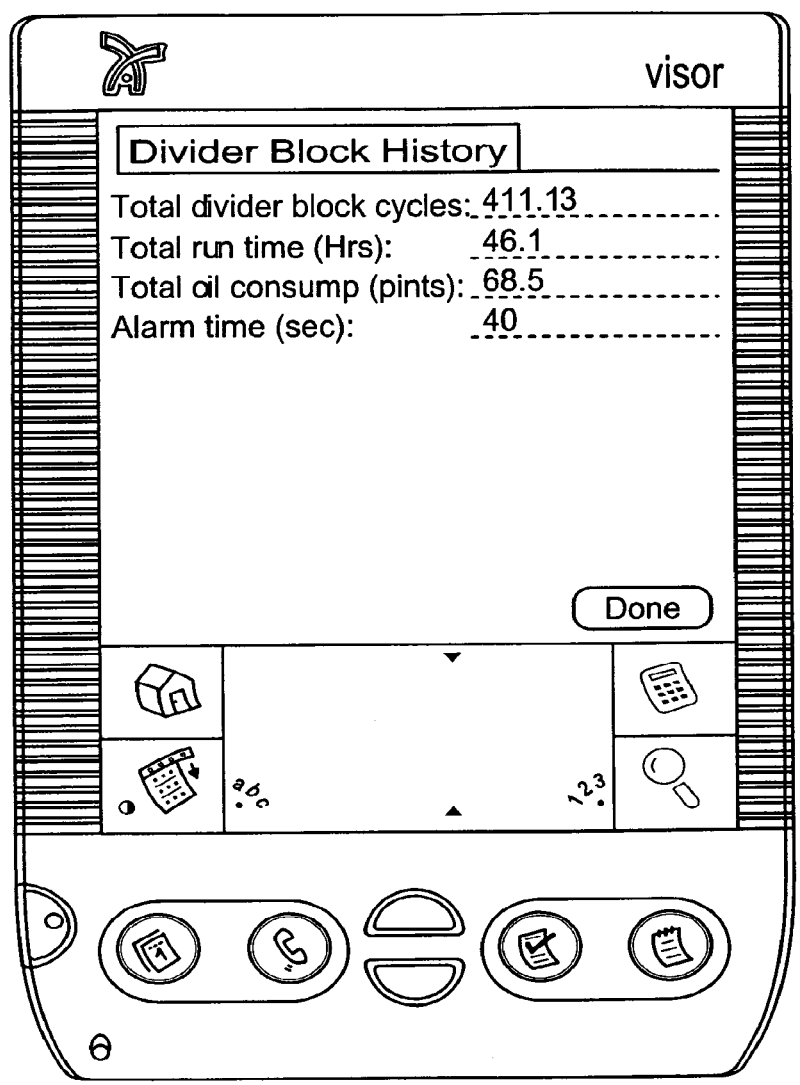
Figure 3F:
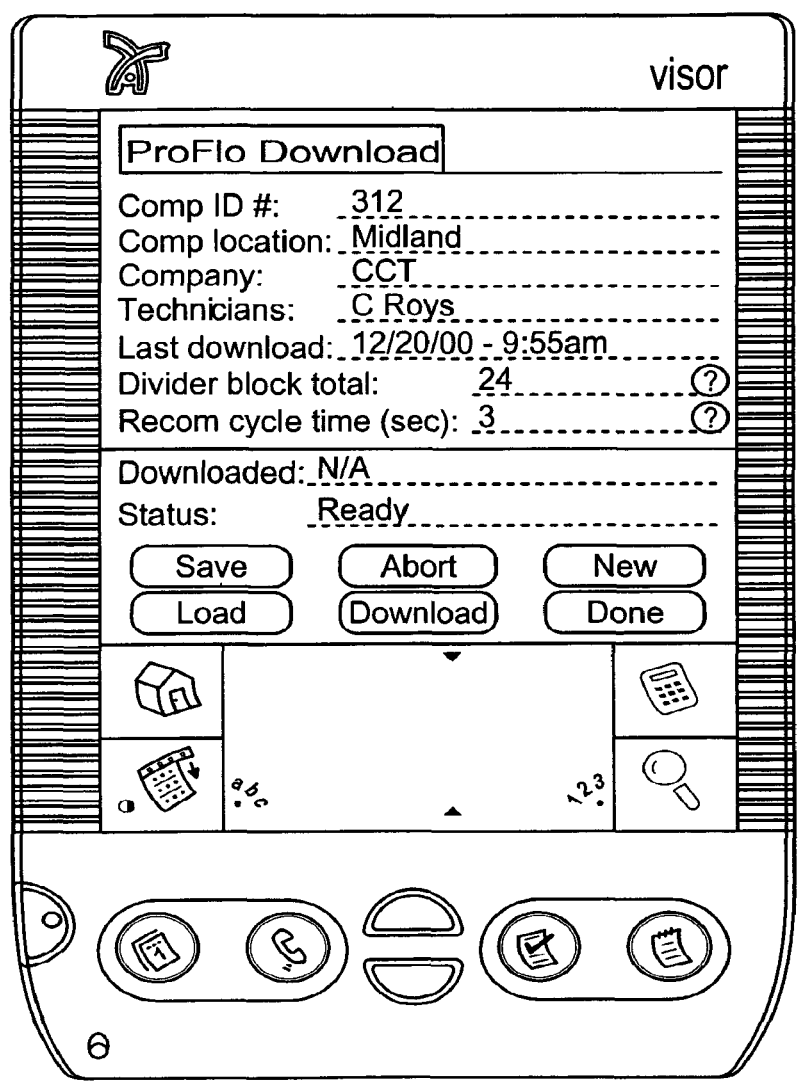
Figure 3G:
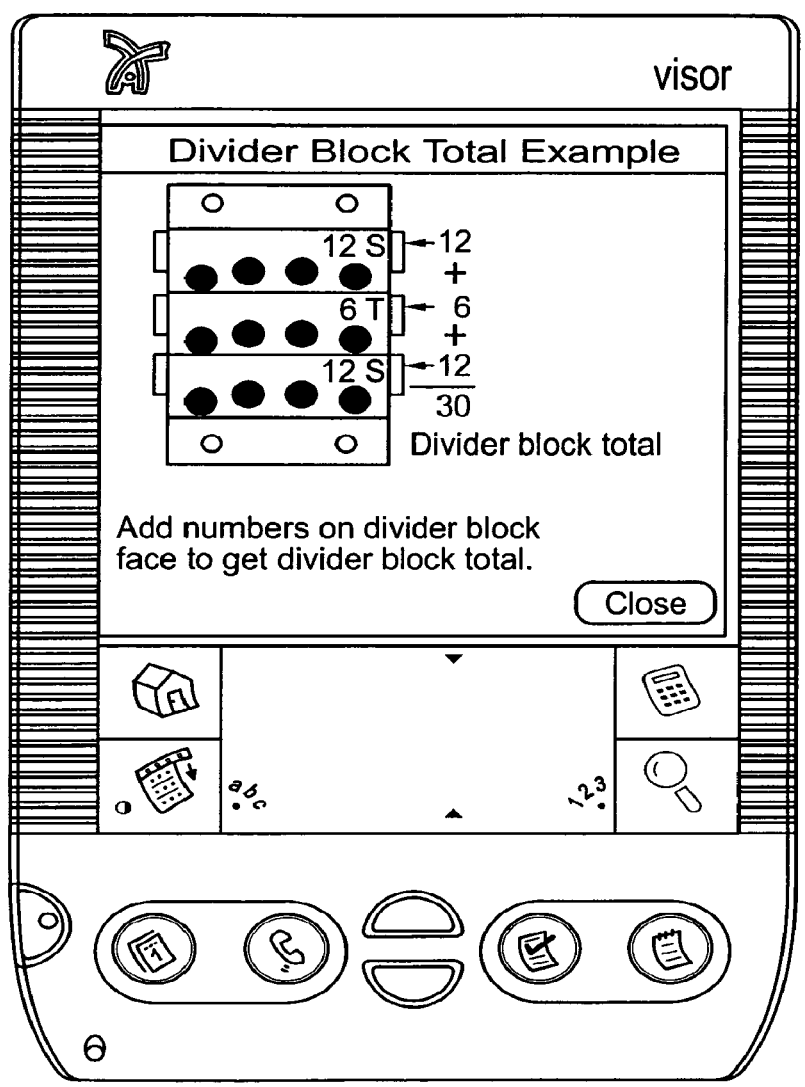
Figure 3H:
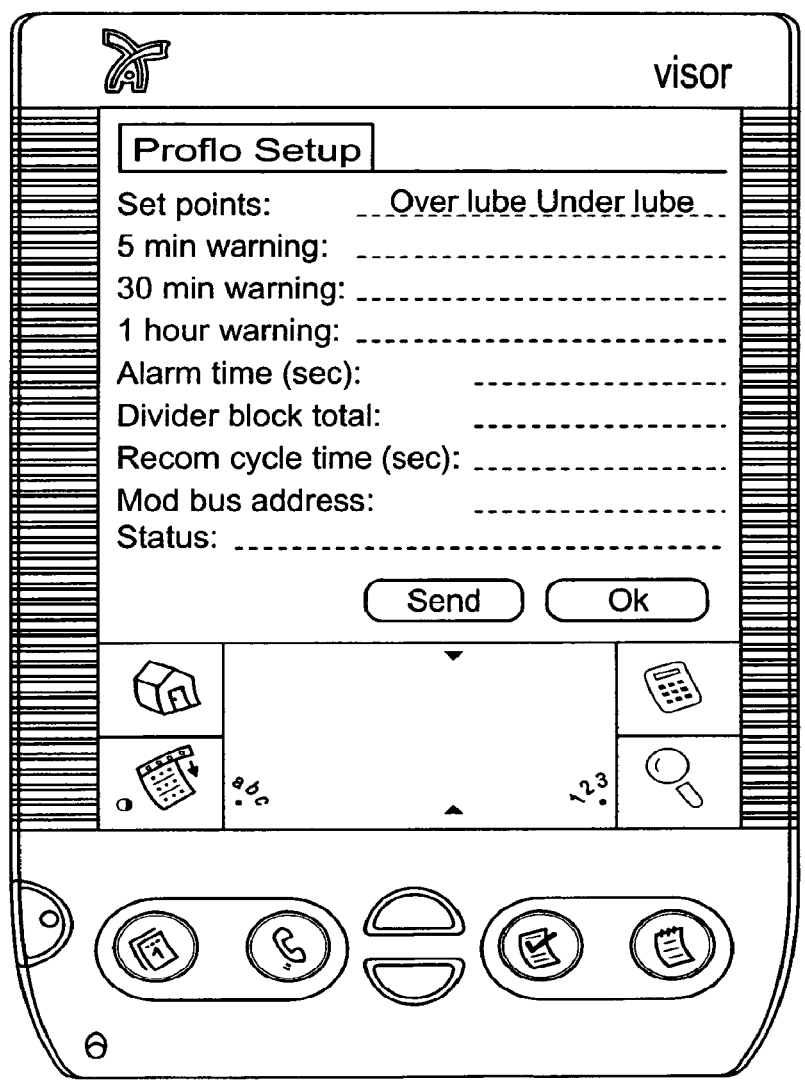

FIG. 3D shows a screen that allows the user to readily locate periods of under lubrication or over lubrication. The user can enter parameters to define what constitutes over or under lubrication. Such conditions can endanger the compressor or waste lubricant and the invention allows such conditions to be readily identified and repaired. FIG. 3E shows the information displayed when a "Divider Block History" is requested. FIG. 3F shows a screen that allows the user to transfer data to or from the fluid flow monitor. Several help screens are available to assist users. For example, FIG. 3G shows a help screen that explains to users how to determine the total flow through a divider block. FIG. 3H shows a set-up screen used to program limits for initiating warning and system parameters such as alarm time, divider block totals, recommended cycle time, and bus address for data communication. Screens 3A-3H are example of typical screens and different screens may be used to enter or display other information. Information from the portable computing device may be transferred to another computer and converted into a format usable by commercially available analysis programs, such as Microsoft Excel or Access.

Figure 4:
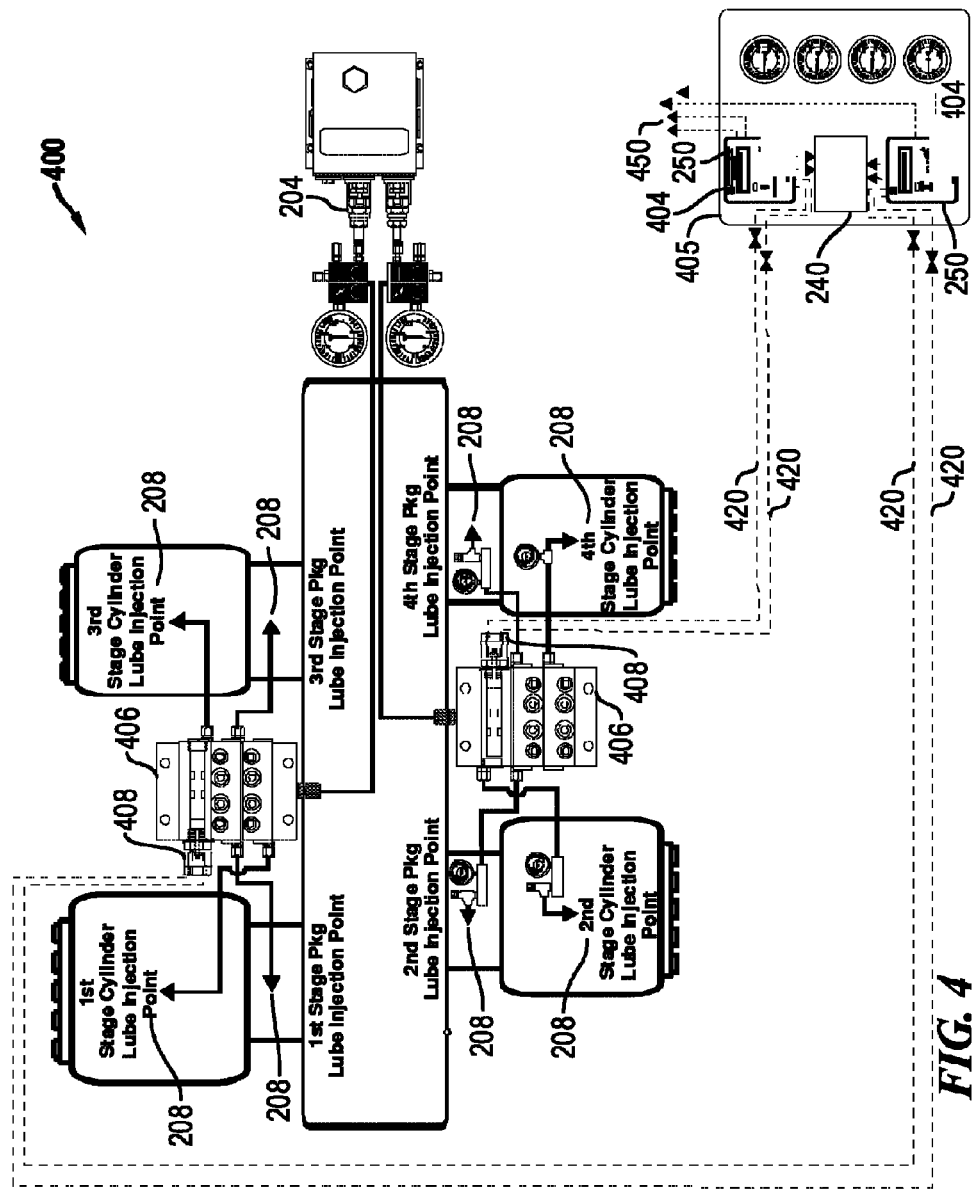
FIG. 4 shows a multistage compressor having two fluid flow monitors mounted on a control panel and receiving piston cycle signals from fluid flow sensors mounted on dispensing valves, the fluid flow monitors providing alarm and fluid trend information locally and optionally via a satellite link to the internet.

FIG. 4 shows a multistage compressor system 400 similar to that shown in FIG. 2, with a different embodiment of the fluid flow evaluation system connected thereto. In the fluid flow evaluation system of FIG. 4, fluid flow monitors 404 are mounted on a control panel 405 away from the divider blocks 406 so a technician need not go to each divider block 406 to download fluid flow data. Fluid flow sensors 408 are mounted on the divider block 406 to detect piston cycles using, for example, a reed switch or a Hall effect sensor. Piston cycle information is transmitted over wires 420 from the fluid flow sensors 408 to the fluid flow monitors 404. As in the previous embodiment, the piston cycle signals are combined in fluid flow monitors 404 with timing signals to determine fluid flow information and the information is stored in the memory.

The fluid flow information in memory can be downloaded to a portable computing device over an infrared link 250 as in the embodiment of FIG. 2, so that information can be transferred in a hazardous environment. The fluid flow monitor 404 can send a signal to alarm 240 when programmed alarm conditions prevail and can also output a shut down signal when necessary to protect the compressor. The alarm and fluid flow information can also be transmitted to a satellite or other communications link 450 so that the fluid flow data is accessible in remote locations, preferably over the World Wide Web or other computer network.

Figure 5:
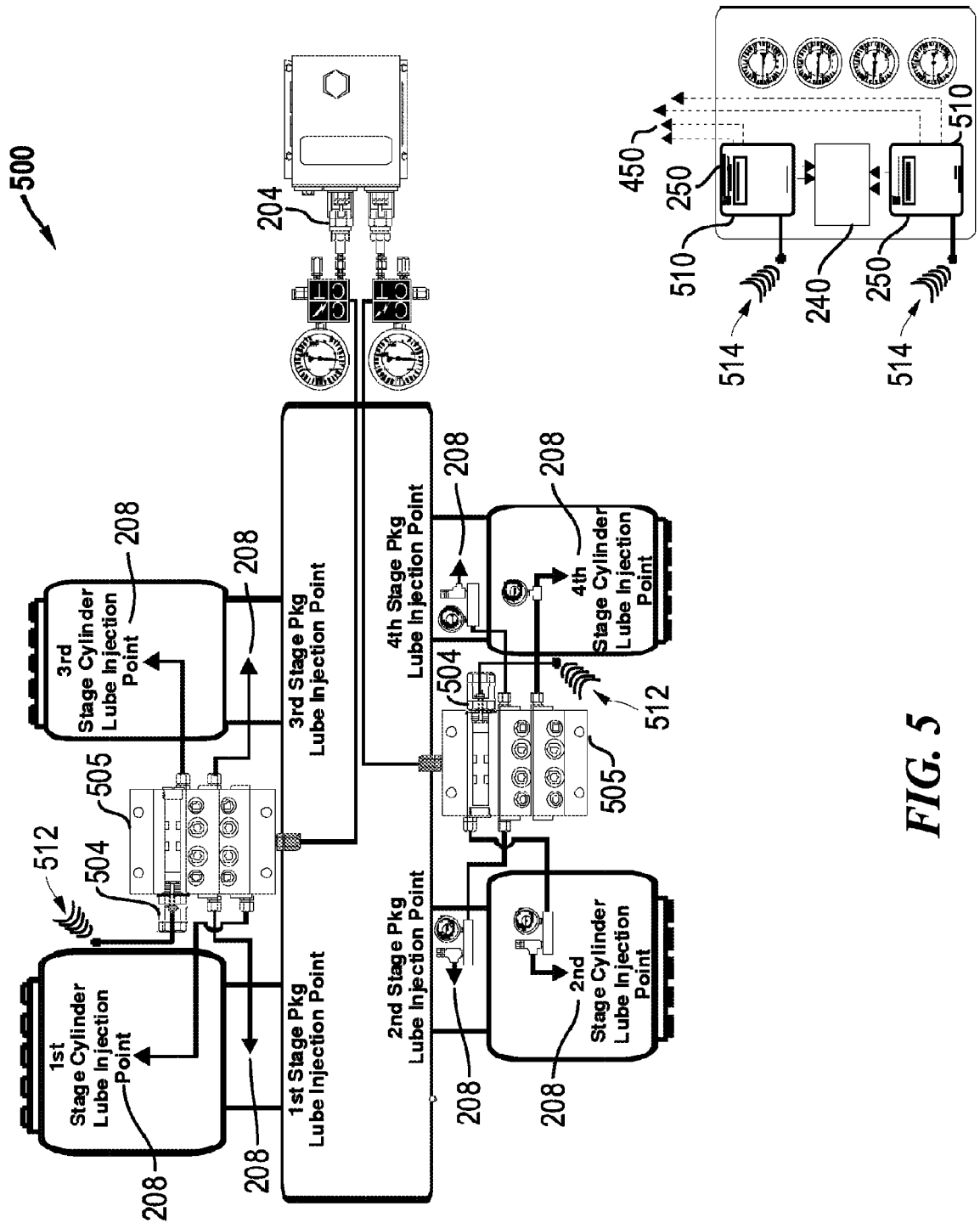
FIG. 5 shows a multistage compressor having two fluid flow monitors mounted on a control panel and receiving piston cycle signals via radio frequency links from fluid flow sensors mounted on dispensing valves, the fluid flow monitors providing alarm and fluid trend information locally and via a satellite link to the internet.

FIG. 5 shows a multistage compressor system 500, similar to those in the previous FIGS. Like the embodiment in FIG. 4, fluid flow monitors 510 are mounted away from divider blocks 505. In the system of FIG. 5, however, radio frequency transmitters 512 transmit cycle signals from fluid flow sensors 504 at divider blocks 505 to the fluid flow monitors 510. By eliminating the requirement to run wires, installation, particularly in a retrofit situation, is greatly simplified and the cost is reduced. Wireless transmitters 512 can be powered by a battery or by a solar energy source. Wireless receivers 514 at fluid flow monitors 510 can also be powered by a battery or by a solar energy source, or the wireless receiver could be powered by a power line. As with the system of FIG. 4, the piston cycle signals are combined by monitors 510 with timing signals to determine fluid flow information and the information is stored in the memory. The memory information can be downloaded to a handheld device over infrared links 250. Fluid flow monitor 510 can produce an alarm signal causing alarm 240 to sound when programmed alarm conditions prevail and can also output a shut down signal when necessary to protect the compressor.

The alarm and flow information can also be transmitted to a satellite or other wireless communications link 450 so that the alarm information or fluid flow data is accessible in remote locations. The data can be made available over the World Wide Web or other computer network. The wireless link of the FIG. 5 system allows the monitor to be remotely mounted in a place that is easily accessible and to receive piston cycle signals from all injection points.

Figure 6:
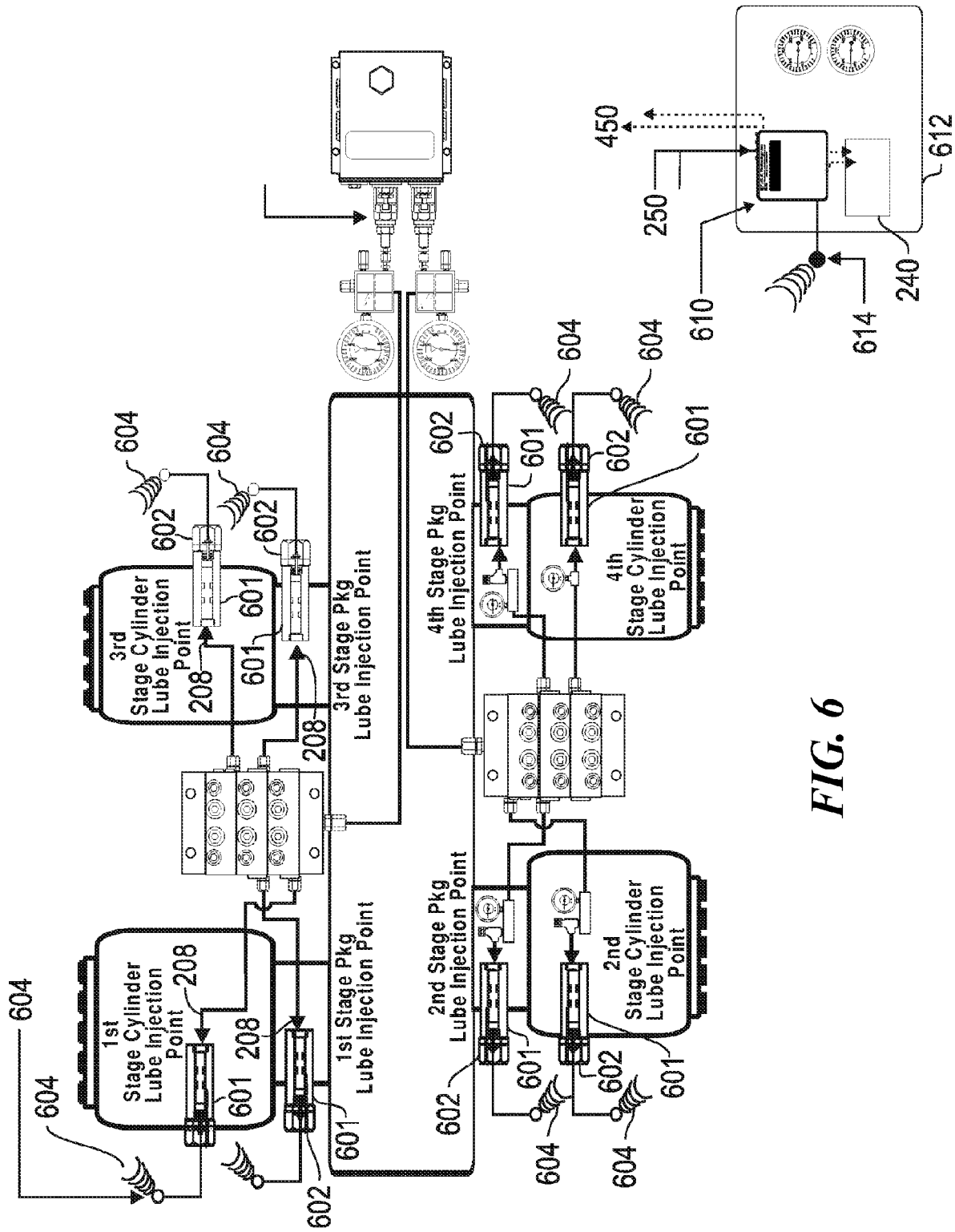
FIG. 6 shows a multistage compressor having a single fluid flow monitor mounted on a control panel and receiving piston cycle signals via a radio frequency link from multiple fluid flow sensors mounted at injection points on the compressor, the fluid flow monitor providing alarm and fluid trend information locally and via a satellite link to the internet.

FIG. 6 shows a system similar to that of FIG. 5, but includes at each injection point a single outlet divider block 601 to inject a fixed quantity of fluid. A fluid flow sensor 602 is mounted on each single outlet divider block 601 to measure the exact amount of fluid dispensed at each injection point. Each fluid flow sensor 602 has an associated wireless transmitter 604 for sending fluid flow information to a single fluid flow monitor 610 positioned on a control panel 612. A receiver 614 associated with the fluid flow monitor 610 periodically polls each transmitter 604 to obtain piston cycle information and converts the piston cycle information to fluid flow information for each injection point 208. By measuring fluid flow at each injection point 208, the actual fluid injected is measured, regardless of whether fluid is lost between the divider block 603 and the injection point 208. When each divider block 601 cycles, a known quantity of oil has been dispensed.

Fluid flow monitor 610 receives and translates piston cycle information from all transmitters 604 and translates the piston cycles to intelligible data for accurate fluid flow. Thus, a single receive 614 can monitor hundreds of injection points and provide accurate information about quantities of lubricant, chemical or fluid.

To measure fluid flow at the insertion point, a preferred fluid flow sensor entails a dispensing valve having a single-input and a single output. The single output dispensing valve operates in a manner similar to that of a conventional divider block, but the dispensing valve dispenses fluid at a single outlet. Thus, a known amount of lubricant is output for each cycle of the pistons and, by sensing piston cycles as described above, the amount of lubricant dispensed can be readily determined. This single-input single output-divider valve is a positive displacement valve. This valve is suitable for measuring at relatively high pressures very small to extremely small quantities, such as a few cubic inches per day in one embodiment, about 14.0 cubic inches in another embodiments and up to about 10 gallons per day in yet another embodiment. Prior art fluid flow measuring devices were either not suitable for accurately measuring flows in this flow range and pressure or were of complex, geared construction too expensive for use in such applications.

Figure 14B:
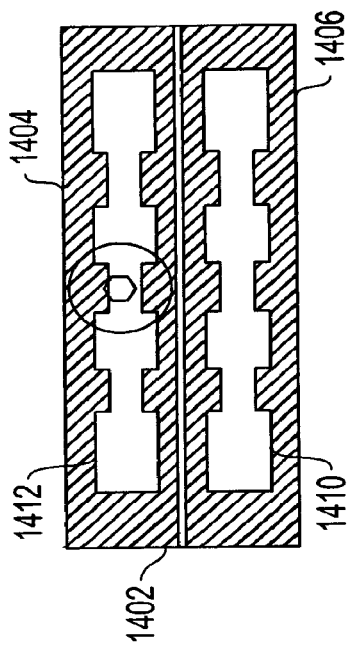
FIGS. 14A-14D show a fluid dispensing valve having a single input and a single output.
Figure 14D:
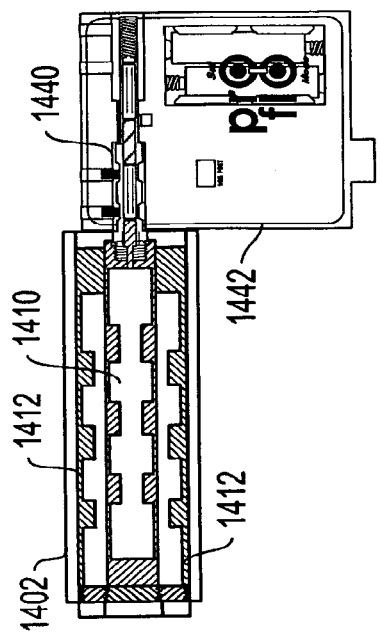
Figure 14A:
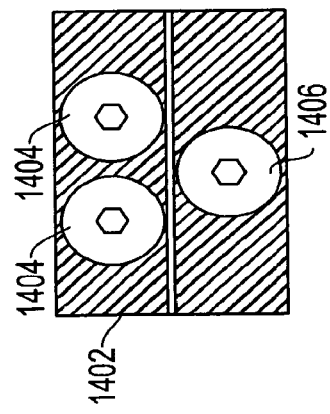
Figure 14C:
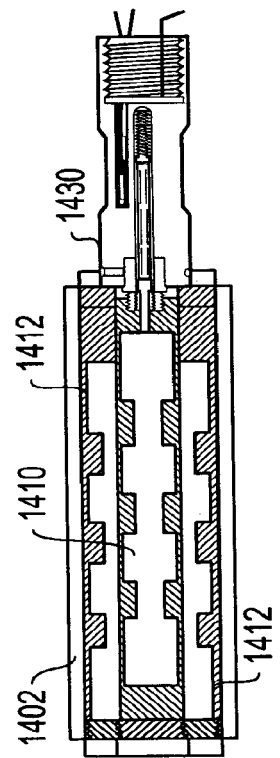

FIGS. 14A-14D shows a single input, single output dispensing valve. Although having a single output, such a dispensing valve can also be referred to generally as a type of divider block. FIG. 14A shows an end view of a dispensing valve 1402 having two cylinders 1404 positioned above a third cylinder 1406. FIG. 14B shows the interior of dispensing valve 1402. FIG. 14B shows a lower piston 1410 in cylinder 1406 and one of upper pistons 1412 in one of the two upper cylinders 1404. Upper pistons 1412 move together. Fluid enters through one of the upper cylinders 1404, moves to a bottom cylinder 1406, and then out of dispensing valve 1402 through an upper cylinder 1404. Skilled persons can readily design pistons and a hydraulic path suitable for various applications, FIG. 14C shows a cross section of single input, single output dispensing valve 1402 with an attached fluid flow sensor 1430 having electrical connections for conveying cycle signals to a remote fluid flow monitor. (Dispensing valve 1402 is shown rotated in FIGS. 14C and 14D so that the lower piston 1412 is shown facing the viewer, and upper pistons 1412 are partially hidden.) The FIG. 14D shows dispensing valve 1402 attached to a fluid flow monitor 1440 that is internal to a fluid flow monitor 1442.

In some implementations, aspects of the embodiments of FIGS. 6 and 5 are combined so that fluid flow is measured at both the dispensing point and the injection point. By measuring at both places, leaks between the two points can be detected, thereby reducing environmental damage and reducing wasted fluid. Any combination of fluid flow sensors can be used.

Systems that use a radio frequency transmitter or receiver to communication piston cycles preferably have a battery indicator so that the battery can be replaced before it fails. Otherwise, properly functioning equipment may shut down because no piston cycles are detected by fluid flow monitor 250.

Figure 7:
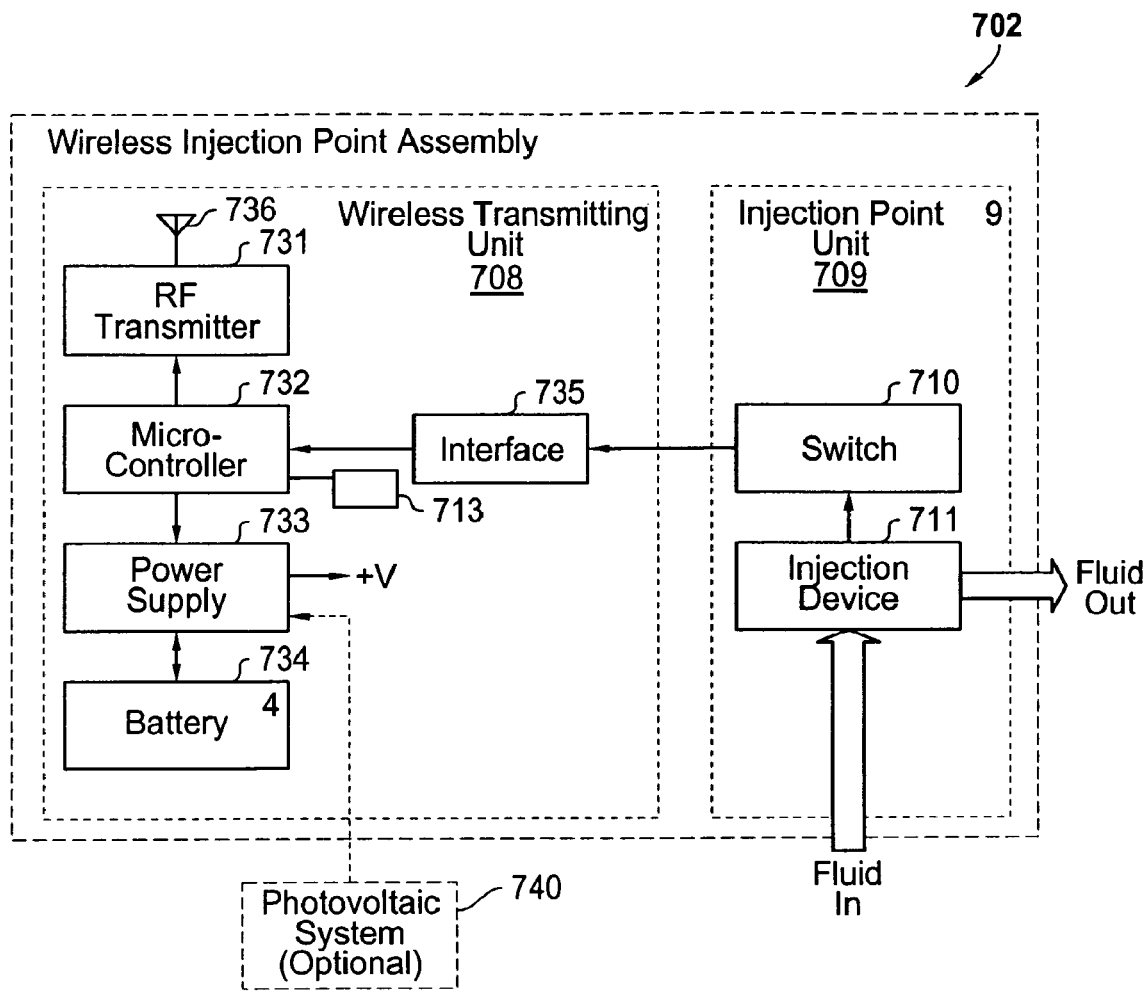
FIG. 7 shows schematically a wireless injection point assembly for measuring fluid flow and transmitting the information to a fluid flow analyzer.

FIG. 7 shows in more detail a wireless injection point assembly 702 comprised of two principle sub-assemblies: a wireless transmitting unit 708 and an injection point unit 709. Injection point unit 709 is comprised of an injection device 711, such as single output divider block 601 or multiple outlet divider block 505 described above, coupled with a fluid flow sensor 710, such as sensor 602 described above. Whenever a fluid pulse is delivered out of injection device 711, the electrical contacts of switch 710 are cycled one time.

Transmitting unit 708 is comprised of a radio frequency (RF) transmitter 731, a microcontroller 732 executing control software stored in memory 713, a power supply 733, a battery 734, interface circuitry 735, and an antenna 736. An optional photovoltaic system 740 can supply power for wireless transmitting unit 708.

Contact closures of fluid flow sensor 710 are passed to microcontroller 732 via an interface 735 that converts the output signal from switch 735 into a signal compatible with the input of microcontroller 732. Microcontroller 732, operating in accordance with software in memory 713, counts the contact closures received from fluid flow sensor 710.

Figure 8:
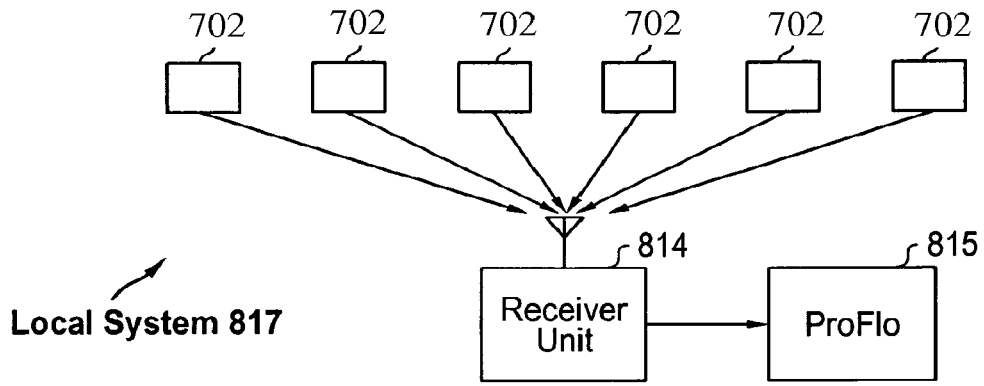
FIG. 8 shows multiple injection point assemblies of FIG. 7 connected via wireless links to a single fluid flow monitor.

FIG. 8 shows the larger environment in which one or more wireless injection point assemblies 702 operate. A local system 817 includes a receiver unit 814 in communication with a fluid flow monitor 815, preferably a Proflo® from C.C. Technology, Inc. Receiver unit 814 receives data from the one or more wireless injection point assemblies 702. Each wireless transmitter unit 708 has a unique identifier and is provided a unique address so that receiver unit 814 can associate incoming date with the appropriate one of wireless injection point systems 702.

Each contact closure recorded causes microcontroller 732 to generate a message containing an identifier value, which uniquely identifies the specific wireless injection point assembly 702, and a count value corresponding to switch closures. This message is formatted for transmitting to the receiver unit 814 working within local system 817. The sending units will send a count to the receiver unit that in turn is used to determine fluid flow, based on the known volume per injection cycle, to a desired accuracy, for example, to $\frac{1}{100}$th of a pint.

This information is stored in the fluid flow monitor 815 to be transmitted to the end user via wireless download to a PDA handheld and to any earth orbiting satellite to connect to the Internet for access by the operator. Time sequencing between pulses of units 702 are determined by the master divider block and collected by the fluid flow monitor or satellite communication device to be transmitted at any given time to the owner/operator or user of the pump or compressor. In a preferred embodiment, different ones of injection point assemblies 702 on the same divider block will not pulse at the same time due to the master divider block system utilizing progressive in-line movement of each piston as it moves oil. This sequencing assures that no two injection point assemblies 702 will transmit data at the same time, and therefore avoids the possibility of a collision of messages and possible failure of receiver unit 814 to receive data being sent by one or more of the injection point assemblies 702.

Figure 9:
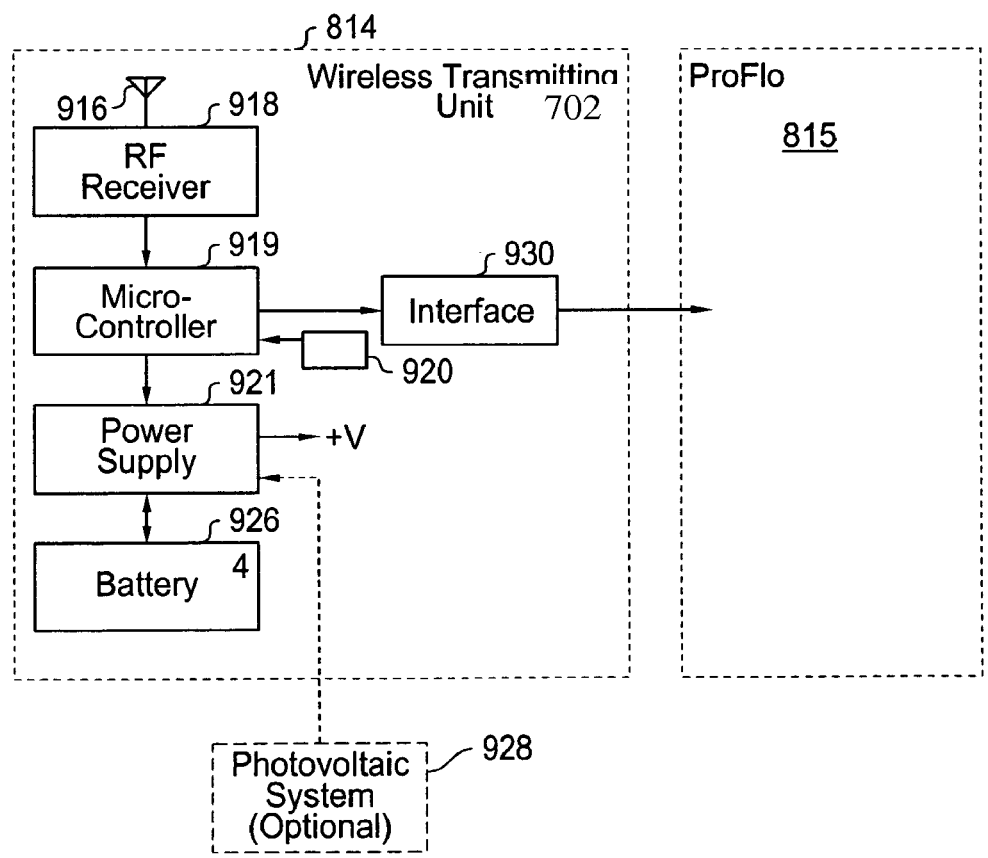
FIG. 9 shows schematically a fluid monitor having a wireless receiver for receiving information from the wireless injection point assembly of FIG. 7.

FIG. 9 shows receiver unit 814 in more detail. Receiver unit 814 includes an antenna 916 for receiving transmission from wireless transmitting unit 708, a radio frequency receiver 918, a microcontroller 919 in communication with a memory 920 for storing program instructions for controlling the operation of receiver 814, and an interface 930 for communication with fluid flow monitor 815. Receive unit 814 also includes a power supply 921 for supplying appropriate voltage and current to components within receive unit 924, a battery 926 for supplying power to power supply 921 when necessary, and an optional photovoltaic system 928 for supplying power to power supply 921.

All information relating to fluid flow is optionally communicated to the receiving unit 814 and transferred by wireless transmitters (not shown) to satellite receivers for viewing on the Internet on secure web sites. This data will inform the operator of any problems with the quantity of oil injected to each lubrication point of the compressor. All lubrication points will have set parameters that will be monitored and stored by the Proflo® wireless system.

In some embodiments, a display can be associated with each injection valve. The display can be integral with or attached to the dispensing valve. The display is typically a liquid crystal display that displays the valve average cycle time in seconds. An average of six cycles is typically used to provide a more consistent, meaningful measurement, although a different number of cycles could be averaged or individual cycle times could be displayed. The injection valve or an attached module incorporates, besides the display itself, a Hall switch or reed switch to activate the LCD counter and indicate each cycle. An integrated circuit times the cycles and computes average cycle times. An internal battery powers the LCD and associated circuitry.

Figure 15:
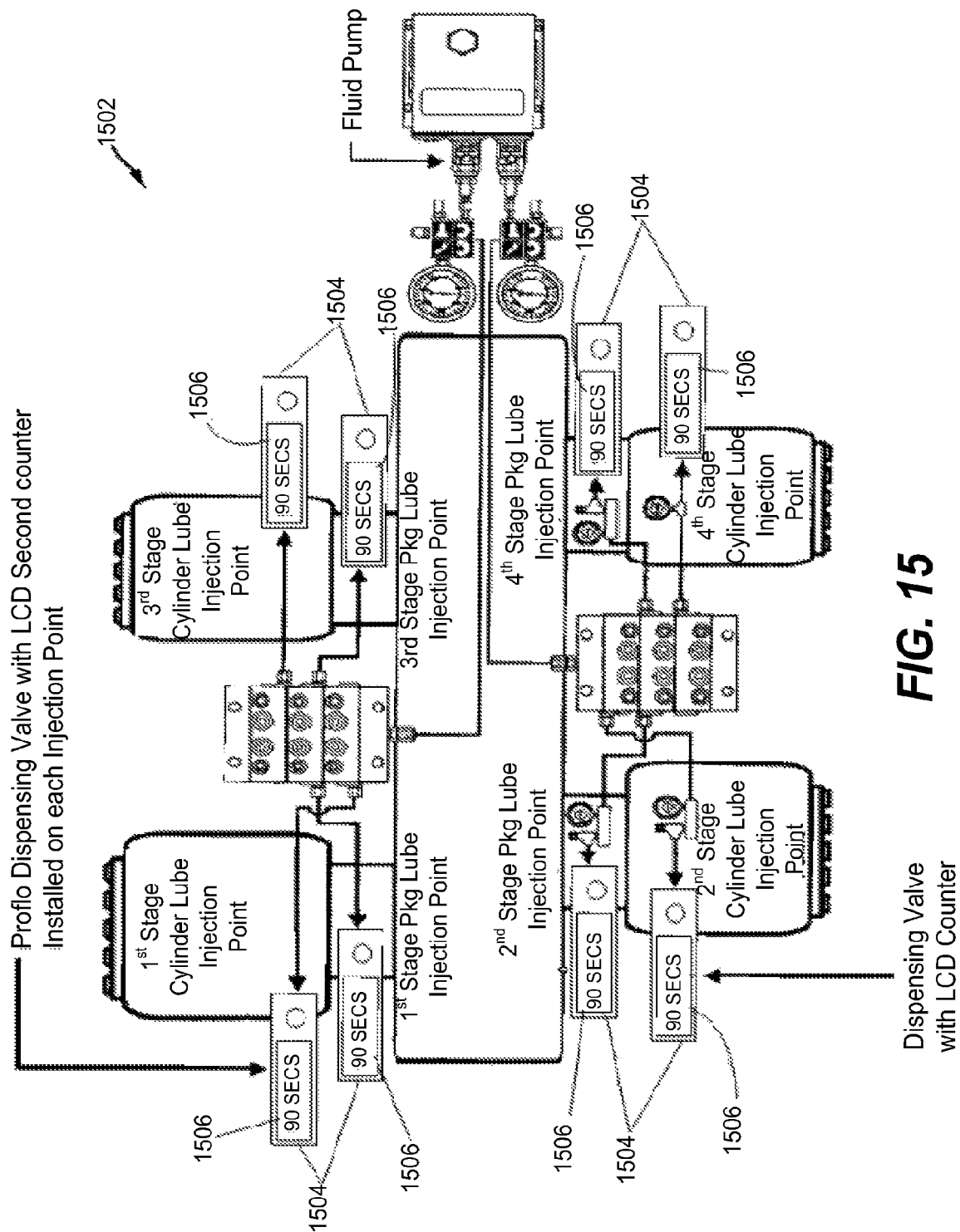
FIG. 15 shows a multi-stage compressor having fluid flow sensors mounted at multiple injection points on the compressor, each of the fluid flow monitors including a liquid crystal display for indicating cycle time.

FIG. 15 shows a multi-stage compressor 1502 that includes multiple dispensing valves 1504 at multiple lubricant injection points, each dispensing valve 1504 having an associated liquid crystal display 1506. The cycle time in seconds is displayed for each dispensing valve. In other embodiments, the LCD counter can be mounted remote from the dispensing valve so as to enable the operator to more easily see the cycle time of the valve. The capability to mount the LCD remote from the dispensing valve time addresses any safety concerns about operators needing to climb over and around the compressor or chemical pump to observe cycle times of the injection point.

Providing the capability to manually monitor the cycle time of the injection valve allows the operator to immediately and inexpensively identify potential system problems, such as the injection of too much or too little lubrication in a compressor, or too much or too little chemical injected in a processing system. A practical method of identifying oil consumption in low volume, high pressure, either mechanically or electronically to each injection point is not currently available in the industry. If there are, for example, ten lubrication points on the compressor, the operator can easily install a dispensing valve on each point and manually monitor each point to ensure the correct amount of lubrication is being injected into each point.

To determined from the displayed flow rate the quantity of oil or chemical injected into each point, the operator uses the following formula: P=6×V/S, where P is the flow rate in pints per day, V is the volume of fluid dispensed each time the dispensing valve cycles one time, and S is the time required for one complete cycle of the dispensing valve. The constant, 6, results from converting cubic inches of fluid to pints and seconds to days.

For example, if the LCD on the dispensing valve indicates an 11 second cycle time, and the volume output of the dispensing valve is 0.030 cubic inch per cycle, 6×30/11, that is, 16.4 pints per day are being injected through the valve.

Figure 10:
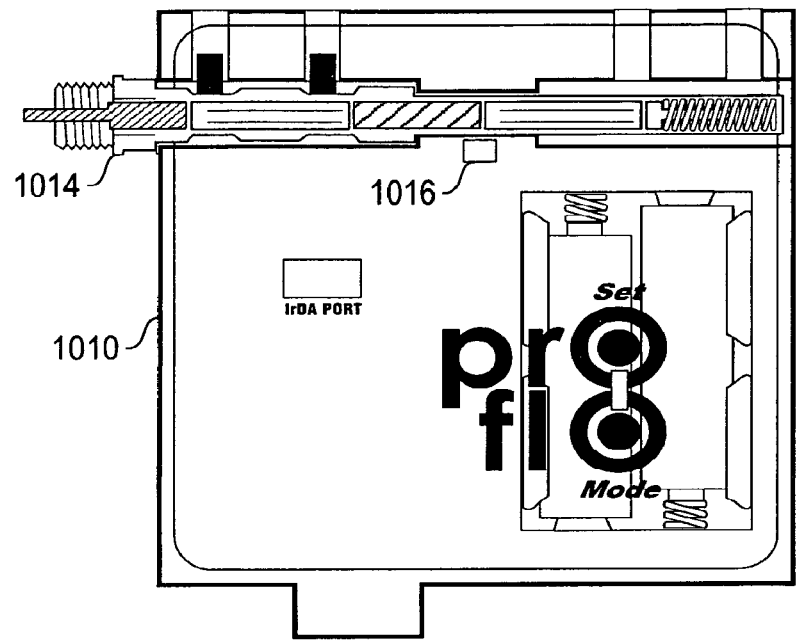
FIG. 10 shows a fluid flow monitor having an internal Hall effect fluid flow sensor.

By displaying only the cycle time and allowing the operator to determine the actual flow rate, the same measurement device can be used on different valves having different volumes. Alternatively, the electronics associated with the display can calculate and display a flow rate, for example, in pints per day, based on a preset or programmable volume and the measured cycle time. As used herein, the term "fluid flow information" includes not only rate information, but any information, such as cycle time, from which a rate can be determined In some embodiments, a fluid flow monitor of the present invention can use a Hall effect sensor switch. Hall effect sensors detect the presence of or change in a magnetic field. Hall effect switches operate as binary switches, with the switch state being turned on when the magnetic field rises above a prescribed value and being turned off when the magnetic field drops below a prescribed value. When positioned close to a magnet, Hall switches have difficulty detecting a small relative displacement because the change in magnetic field is very slight. FIG. 10 shows a fluid flow monitor 1010 having an internal fluid flow sensor 1014 that uses a Hall effect sensor 1016 mounted on the fluid flow monitor 1010 for use, for example, in a system like that shown in FIG. 2. A fluid flow monitor having an internal fluid flow sensor can be mounted at a divider block or at an injection point. A fluid flow monitor can also be mounted away from a fluid flow sensor, with connection from the fluid flow sensor to the fluid flow monitor provided by wire or wireless methods.

Figure 11:
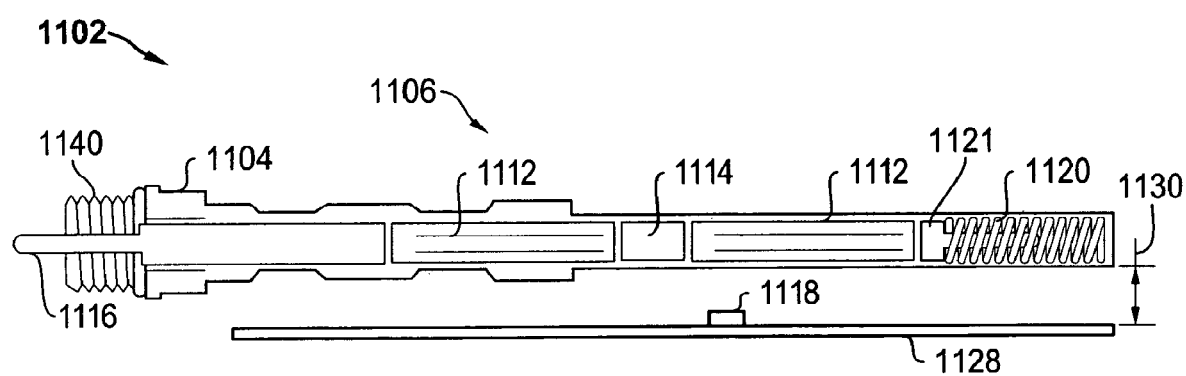
FIG. 11 shows an enlarged view of the fluid flow sensor of FIG. 10.

FIG. 11 shows a fluid flow monitor sensor 1102 that comprises a housing 1104, a magnetic assembly 1106 comprising two magnets 1112 separated by a non-magnetic spacer 1114. A hydraulically driven piston (not shown) pushes a non-magnetic, preferably stainless steel, piston follower 1116 that moves magnetic assembly 1106 relative to Hall effect sensor 1118. A spring 1120 biases the magnetic assembly 1106 against piston follower 1116 and causes magnetic assembly 1106 to follow piston follower 1116 when it moves away from magnetic assembly 1106.

The magnets are oriented such that the opposite poles face each other across the spacer, which is preferably composed of a 300 series stainless steel. In one embodiment, magnets 1112 are composed of Alnico 5 alloy, have a strength of about 60 gauss, a diameter of 0.187 in, and a length of 1.0 inch. In this embodiment, non-magnetic spacer 1114 similarly has a diameter of 0.187 in, is preferably about 0.30 inches long, and made of 304 stainless steel. The sensor switch 1118 itself is, for example, an Allegro Model A3210ELH operating at between 2.5 V and 3.5 V, and rests on a printed circuit board 1128 that is positioned a distance 1130 of approximately 0.25 in away from the edge of housing 1104.

The design of magnet assembly 1106 produces a region having a large change in magnetic field over a small distance, thereby enabling the Hall effect transistor 1118 to operate properly in close proximity to magnetic assembly 1106, with minimal travel of the magnetic assembly 1106. The travel of the piston in the divider block assembly is approximately 0.125 inch, Prior art magnet assemblies that use a Hall effect sensors in close proximity to the magnet are unreliable because the change in the magnetic field corresponding to such short piston travel is relatively small and difficult to reliably detect. By using a configuration that concentrates the magnetic flux, the magnetic field is directed into a peak, which produces a magnetic field of approximately 60 Gauss. When the magnets move 0.125 in, the magnetic field will drop to less than 10 Gauss. The change in magnetic field is readily and reliably detected by Hall effect sensor 602.

Figure 12:
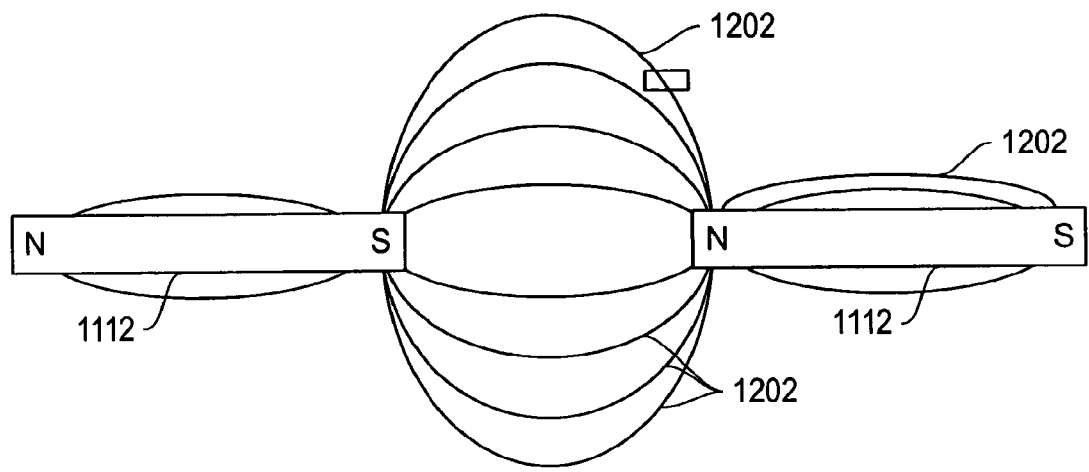
FIG. 12 shows roughly the magnetic flux lines around the magnetic assembly of FIG. 11.

FIG. 12 shows a rough approximation of the magnetic flux lines 1202 produced by magnet assembly 1106 and the preferred position of the Hall effect sensor 1118 within the magnetic field. Note that the sensor is preferably positioned above one of the magnets 1112 and not in the center of the spacer 1114. The configuration of the two magnets separated by a non-magnetic spacer provides four regions in which the magnetic field changes rapidly in space. In one embodiment, the magnetic field can vary from about 60 gauss to about 10 gauss within about 0.125 inch. This change in field over a small distance allows the use of a relatively low power, inexpensive sensor, such as the type typically used in cellular telephones, which require a change of about 50 gauss for accurate detection. Using the above example as guidance, a skilled person will be able to design a magnet assembly, either experimentally or by using magnetic field modeling software, for different applications by varying the length of the spacer to achieve the required flux gradient.

Another embodiment of a Hall effect sensor uses a single magnet with the sensor precisely centered over the magnet and positioned about one quarter of an inch away from it. The magnet is preferably composed of Alnico 5 alloy because of the better symmetry of the magnetic fields around such magnets. By positioning the Hall effect sensor precisely above the center of the magnet, the required change in magnetic field to activate the Hall effect switch is achieved as the magnet is moved a small distance, typically about one quarter of one inch, by the piston follower.

In some prior art fluid flow sensors used with a lubricant distribution blocks, the magnet, spring, and spacer have nothing to keep them in the housing place when the unit is removed from the dispensing valve. When a technician removes the sensor housing from the distribution block, the magnet, spring, and spacer can fall from the housing and become lost, dirty, or damaged. The components must be thoroughly checked for damage, cleaned, and re-installed in the magnet housing. Any foreign particles or contamination inside the magnet housing will cause the movement of the parts to be inhibited, which will give erratic switch closures to monitoring equipment and cause phantom shutdown of the machinery being monitored. Phantom shutdowns and erratic monitoring cause the industry thousands of dollars in lost revenue due to downtime of the machine. To solve this problem, some prior art fluid flow sensor units are sealed at the factory and cannot be opened in the field to replace damaged components. This increases maintenance expenses by requiring the whole unit to be replaced when an inexpensive component, such as a spring, breaks.

An inventive proximity switch eliminates the possibility of lost or damaged components and introduction of dirt or foreign particles inside the housing. In one preferred embodiment of a fluid flow sensor, the switch components, such as the spring and magnets, are trapped inside a housing so that the components cannot fall out when the switch is installed or removed, but the switch can be disassembled to remove the components for repair, such as to replace a weak or broken spring.

Figure 13A:
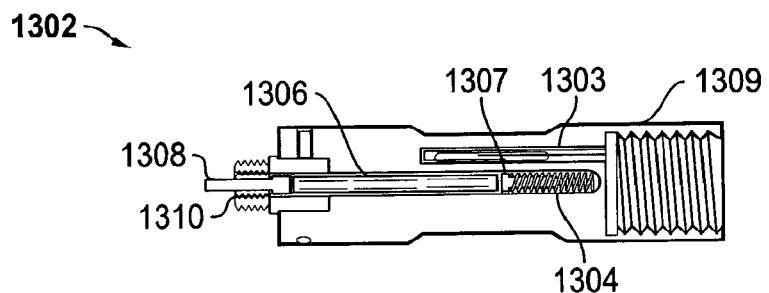
FIG. 13A shows a fluid flow sensor having a contained magnet and a reed switch.

FIG. 13A shows a fluid flow sensor 1302 that comprises a single pole, single throw magnetically operated reed switch 1303. A spring 1304, magnet 1306, spacer 1307, and pin 1308 are contained within a housing 1309 by a threaded insert 1310 that prevents the loss of parts by a person installing the unit on a dispensing valve.

Figure 13B:
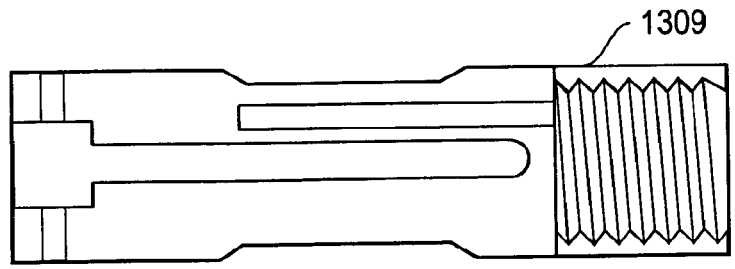
FIG. 13B shows the housing of the fluid flow sensor of FIG. 13A.

FIG. 13B is an enlarged view of housing 1309 for fluid flow sensor 1302 and FIG. 13C is an exploded view showing how the parts of fluid flow sensor 1302 are assembled. Fluid flow sensor 1302 includes within stainless steel housing 1309 and magnet 1306, spring 1304, spacer 1307 and pin 1308. Magnet 1306, spring 1304 and pin 1308 are contained inside the threaded housing by stainless steel pin 1312 having a change in diameter along its length to produce a shoulder. Threaded insert 1310 has a hollow hexagon passage and is screwed into housing 1309 using a hex-head wrench after the other components are inserted. The hexagonal passage allows pin 1308 to slide in and out with cyclic movement of the fluid flow dispensing valve piston, but the shoulder, which cannot fit through the hollow passage in threaded insert 1310, prevents pin 1308 (and therefore magnet 1306, spring 1304 and spacer 1307) from falling out of the housing 1309. The spacer 1307 is connected to the spring 1304 by a machined section, which snaps into the spring. Magnet 1306, spring 1304 and spacer 1307 can be removed for repair by unscrewing pin 1308 from housing 1309.

Fluid flow moves the cyclic piston located in the dispensing valve (not shown) which forces pin 1308 and magnet 1306 to move back and forth in a lateral movement past the reed switch 1303 causing it to open and close. The reed switch sends a dry contact signal to a fluid flow monitor. The fluid flow monitor can be used use with any control monitoring device that utilizes a dry contact switch closure to detect pulses or switch closures. Such devices include all progressive in-line dispensing valves that disperse fluid for volumetric measurement.

Instead of the reed switch shown in FIGS. 13A-13C, a Hall effect sensor could be used with an appropriate design of the magnets and housing. FIG. 13D shows an exploded view of fluid flow monitor 1012 of FIG. 11. As in the fluid flow sensor 1302, a threaded insert 1350 keeps the components inside housing 1104.

The ease of downloading fluid flow, trending and alarm information on-site by infrared data link to hand held computer devices or via satellites from the site to the WWW allows a system of the present invention to greatly improve the efficiency of fluid flow systems. Fluid flow analysis software expedites understanding the downloaded fluid flow information and provides useful information to service personnel in easy to understand form. In some embodiments, "raw" cycle data is sent over the Internet and is converted to more easily used fluid flow rate information at a site remote from the sensor. In other embodiments, the cycle signals are converted to flow rate, average cycle period, or other information before being sent.

The use of this fluid flow monitor in any of these fauns will give the operator and industry a method of monitoring and trending fluid flow never before possible. This will save the industry hundreds or thousands of dollars in lost revenue due to failed components caused by too little or too much lubricant, chemical or fluid being injected into the compressor, well bore, or mechanical device. This monitor will also save the industry untold dollars in revenue due to wasted lubricants, chemicals or fluids harming the environment.

The software on the handheld computer device trends the use of fluid, thereby allowing instant knowledge of fluid use trends that can show changes over time. Software for analyzing the downloaded information can be used to show trends in the fluid flow, which can indicate problems before they become critical, or indicate past problems, that may be a hidden cause of machinery failures.

The software preferably stores 365 days of fluid flow information. The software will also convert the fluid flow information to a standard application, such as Microsoft Excel spreadsheet, for custom analysis. The fluid flow file identifies the compressor to which the fluid flow sensor was connected, the technician responsible for the system, the daily flow rates, over flows, under flows.

With remote mounting of a fluid flow monitor using radio frequency (rf) signals, monitoring every point using a master control box, and then using software for instant downloading and easily analysis or downloading via satellite, the service personnel have ready access to more information than ever before about fluid flow in small pumps and lubrication systems and oil flow through dispensing valves.

A fluid flow monitor can optionally include a global positioning system that indicates its position. When information is transmitted by satellite, the position is also transmitted. A user can view the position of the fluid flow monitor on a map, along with fluid flow information. Thus, service personnel can monitor fluid flow at a large number of points automatically. When an alarm condition occurs, the service person can immediately see the geographical location of the system generating the alarm. Of course, the location of each fluid flow monitor could also be programmed into the fluid flow monitor for transmission with the data, obviating the use of the GPS system. However, by using the GPS option, the position is detected automatically, without depending on an individual to re-program the location when the fluid flow monitor is initially set up or moved.

By using radio frequency transmission between the fluid flow sensors and the fluid flow monitors and then transmitting fluid flow information, including GPS information via satellite to a web site, installation of the system is greatly simplified and accuracy is improved. This allows a user to install systems to monitor a large number of fluid flow points with minimal installation and operation costs. By providing this information, industry will save an enormous amount of money by reducing consumption of excess fluid and by saving expensive equipment before it fails from lack of lubricant. For example, a large term reduction of lubricant may affect the longevity of a machine, even if the lubricant has not decreased to an alarm level. Users can spot trends of lubrication use to detect problems before they significantly affect the machinery or fluid consumption. They can see latitude and longitude of chemical pumps because the GPS unit is on site.

The invention typically measures with great accuracy a low volume, high pressure fluid flow at some point on the discharge side of a pump. An integrated system of the invention can measure fluid flow not only at the output of dispensing valves that distribute fluid between multiple channels, but alternatively or additionally, at one or more fluid injection points. Thus the actual fluid delivered is measured and any discrepancy between the distribution dispensing valve flow data and injection point flow data indicates a leak or a worn dispensing valve. The invention is "scalable" and can be implemented with a large number of fluid flow monitors and measuring points.

The fluid flow monitor can be readily retrofitted to existing installations. The use of battery or solar powered radio frequency links between the measurement point and the fluid flow monitor facilitate installation at a large number of measuring points and reduce installation costs. The use of a satellite link and Internet access makes the data accessible anywhere in the world. Thus, service personnel can monitor fluid flow at any time of the day or night without dispatching an individual to the site to collect data from each of the fluid flow monitors.

The invention is particularly applicable to systems having fluid flow at high pressures and low volumes. For example, systems having a fluid flow volume of less than about 80 pints per day at a pressure of greater than about 500 psi. The invention can be used with fluid flows as low as about 3 pints per day or lower and at pressures as high as 5,000 psi or higher. A typical operating condition is about 8 pint per day at about 3,000 psi. The fluid flow sensors of the present invention include positive displacement pumps, operated by the pressure of the fluid being processed, and the sensors operate on the discharge side of the fluid pump, thereby providing accurate information at low flow volumes and high pressure, and provide information about fluid flow near or at the actual point of fluid use. The volumes and pressures described above apply to sensors attached to single inlet, single outlet dispensing valves as well as to sensors attached to multiple outlet divider valves.

The invention is suitable for monitoring and evaluating fluid flow of lubricant for machines, such as compressors and pumps, and for controlling the flow of fluids into well bores, pipelines, cooling towers, etc. The invention will have a great economic impact, particularly in the oil and gas industry, and on the environment by controlling excessive or too little lubrication or chemical substances injected into compressors, well bores, pipelines, and several other critical areas needing accurate flow monitoring and evaluation, as well as immediate warning if flow volumes are outside of the specifications.

In one embodiment, the fluid flow monitor is in data communication, either via wire or wireless data transmission, directly or indirectly, with a control device that controls the fluid flow. As described with respect to previous embodiments, switch closure information is translated into fluid flow information. A microprocessor can be used to compare the fluid flow information to known fluid flow requirements for a particular fluid flow system. Based on the comparison between the measured fluid flow and the fluid requirements of the system, the fluid flow can be adjusted.

For example, an electromechanical control device can be mounted onto the fluid pump to adjust the fluid flow. In one embodiment, the control device turns an adjustment knob clockwise to lower the amount of fluid flow and counter clockwise to adjust the pump to inject more fluid. The pump adjustment mechanism can be, for example, an integral part of a pump, that is, the mechanism can be incorporated into the design of the pump, or the mechanism can be designed to be retrofitted to an existing pump. The pump being adjusted is typically a positive displacement, high pressure, low volume pump used to pump chemicals or lubricating oil. A mounting bracket adapted to the particular control device and pump can allow a technician to retrofit an existing pump in place of purchasing a new complete pump with the integral adjusting mechanism.

The microprocessor, which can be, for example, a stand alone processor or controller or part of a computer, compares the measured fluid flow with the desired fluid flow and send adjustment signals can integrated into a fluid flow monitor, such as the Proflo® device described above. The fluid flow monitor could be positioned, for example, at one of the positions previously described, that is, by a dispensing valve as shown in FIG. 2 or at a central location as shown in FIGS. 4, 5, and 6. The microprocessor can also be located remote from the physical fluid distribution system and information, such as switch closures, cycle period, flow rate, or fluid quantity, can be transmitted, such as by satellite communications link, Internet, or a combination of satellite link and Internet, to the microprocessor. The signal to adjust the fluid flow can be determined and transmitted fully automatically, that is, without operator intervention, or can require operator intervention.

After the fluid flow is increased or decreased, the fluid flow measuring device registers the changed fluid flow, and confirms that the fluid flow rate is correct. If the fluid flow is not correct, additional signals can be sent to adjust the flow rate. If the fluid flow measuring device indicates that after repeated attempts at adjustment, the fluid flow rate is still no correct, an alarm can sounded or a signal sent to a system operator to investigate. For example, a pump may be damaged and incapable of being adjusted to produce the required flow.

Figure 16:
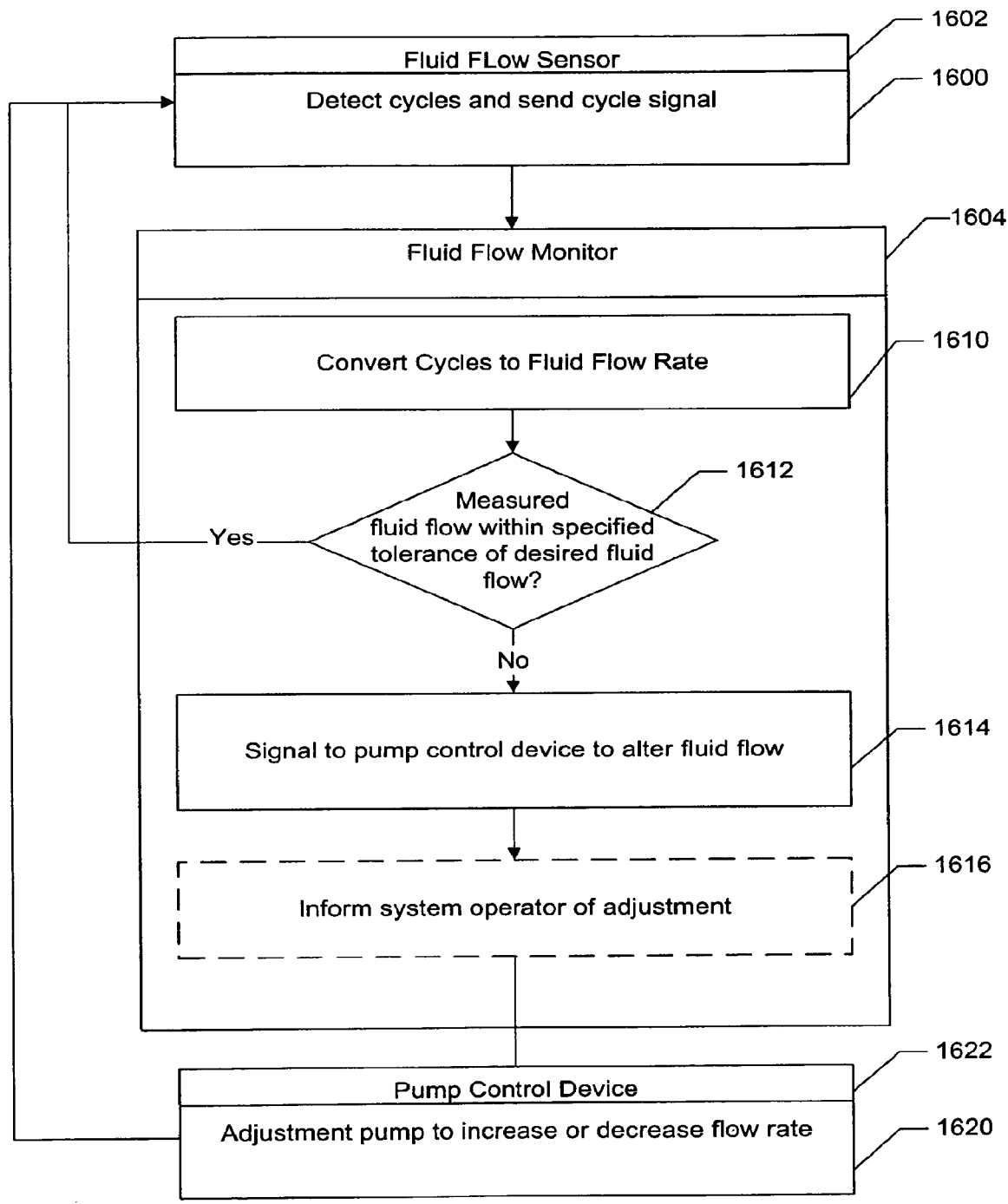
FIG. 16 is a combination block diagram and flow chart showing the components and steps of a system that automatically adjusts fluid flow based upon fluid flow measurements.

FIG. 16 is a combination flow chart and block diagram showing the components and steps in a preferred embodiment. In step 1600, a fluid flow sensor 1602 senses a cycle and sends the cycle signal to a fluid flow monitor 1604. Fluid flow monitor counts cycles in step 1610 to determine a fluid flow based on a known volume of fluid moved for each cycle. In decision block 1612, the fluid flow rate is compared to a desired fluid flow rate, and in step 1614, a signal is sent to a pump control device if the flow rate is not within defined parameters. In optional step 1616, a system operator is notified that the flow rate is being adjusted. The notification can be, for example, via the Internet. As describe above, the function of the fluid flow monitor 1604 can be performed locally or remotely, such as by a computer receiving cycle signals and transmitting pump adjustment signals telephonically, over the internet, via radio including satellite, or through some combination of the above or other means.

In step 1620, a pump control device 1622 adjusts the pump flow, for example, by rotating a control knob. Fluid flow sensor 1602 continues to monitor the fluid flow, and the process repeats.

This automatic adjustment can eliminate the need for human intervention and allow equipment, such as a compressor lube oil pump or chemical injector, to maintain constant oil, chemical or other fluid flow. Continuous monitoring and automatic adjusting can save industry hundreds of thousands of dollars in excessive loss of oil, chemical or any type of fluid which needs to be controlled to eliminate worn compressor parts, well bore or pipeline damage. The invention can also reduce environment damage caused by too little or too much fluid flow, for example, when used in conjunction with the chemical injector pumps.

In one embodiment, all flow and adjustment information sent to the electro-mechanical device is also transmitted to the Internet to enable the owner/operator to monitor any adjustments of the pump. If the lube oil or chemical pump cannot be adjusted to accommodate the fluid flow necessary to maintain the system integrity, the Proflo® monitor will immediately send a warning message, via the Internet, as an alarm to notify the owner operator of a malfunction of the system. The equipment operator can then send adjustment specification signals over the Internet to the Proflo® control monitor to adjust the pump manually from any computer with WWW access.

The system described above includes many parts, some of which are optional and some of which may be separately patentable. Not every aspect of the invention need be included in every embodiment. The scope of the invention is defined by the appended claims and is not intended to be limited by the summary or detailed description, which are provided as examples. The term "fluid flow information" as used herein includes not only fluid flow rates in volume per time, but also cycle signals, cycle period or frequency information, or other information that can be correlated to fluid flow or consumption.

The invention has been described with respect to a lubricant and compressor, but the invention can be used to measure any fluid, including for example, glycol or other chemicals. Skilled persons will recognize that the components may need to be constructed from different materials to resist corrosion when corrosive fluids are used. The invention has wide applicability for monitoring the use of chemicals in everyday operation of oil and gas production equipment and gas compressors. Chemicals are commonly pumped into a well bore to increase production. The invention can be used, for example, to ensure that the correct amounts of chemicals are injected, thereby optimizing the well operation.

The invention is useful in any low volume fluid flow application, such as chemical pumps, in which accurate measurements are requires, particularly where high pressures are used. The invention uses positive displacement pumps at low volumes and high pressures. Small pistons in positive displacement pumps all the invention to accurately move and measure extremely small quantities of liquid, for example, as small as 0.006 cubic inches, and to accurately trend use to 0.01 pint every thirty minutes.

It should be understood that various changes, substitutions and alterations could be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A fluid flow sensor for use with a dispensing valve having a piston, the sensor comprising:
 a housing including an externally threaded portion mateable with the dispensing valve;
 a magnet assembly slidably positioned within the housing, wherein the magnet assembly comprises:
  a first magnet have a first north pole and a first south pole opposite the first north pole
  a second magnet having a second north pole and a second south pole opposite the second north pole; and
  a spacer between the first and second magnets wherein the first and second magnets are oriented such that:
   when the first north pole is located proximal to the spacer and the first south pole is located distal to the spacer, the second south pole is located proximal to the spacer and the second north pole is located distal to the spacer, or
   when or the first south pole is located proximal to the spacer and the second north pole is located distal to the spacer, the second north pole is located proximal to the spacer and the second south pole is located distal to the spacer;
 a piston follower coupled to the magnet assembly and comprising a shoulder portion slidably positioned within the housing;

a spring positioned within the housing and operative to bias the magnet assembly and piston follower towards the piston during operation, whereby piston movement is transmitted to the magnet assembly; and a retainer portion disposed on the housing and confronting the shoulder portion whereby the magnet, piston follower, and spring are retained within the housing.

2. The fluid flow sensor of claim 1, wherein the piston follower includes first and second diameters.

3. The fluid flow sensor of claim 1, wherein a portion of the piston follower extends from the housing.

4. The fluid flow sensor of claim 1, wherein the piston follower is a separate part from the magnet assembly.

5. The fluid flow sensor of claim 1, wherein the retainer portion is a separate part from the housing.

6. The fluid flow sensor of claim 1, further comprising a spacer disposed between the magnet assembly and the spring.

7. The fluid flow sensor of claim 6, wherein the spring has an inside diameter and wherein a portion of the spacer extends into the inside diameter of the spring.

8. A fluid flow sensor for use with a dispensing valve having a piston, the sensor comprising:

a housing including an externally threaded portion mateable with the dispensing valve;

a pair of magnets slidably positioned within the housing;

a spacer positioned between the pair of magnets, wherein each of the pair of magnets have opposing poles such that a first of the pair of magnets has a first pole adjacent to the spacer and a second of the pair of magnets has a second pole adjacent to the spacer wherein the first pole and the second pole are opposing poles;

a piston follower coupled to the pair of magnets and comprising a shoulder portion slidably positioned within the housing;

a spring positioned within the housing and operative to bias the pair of magnets and the piston follower towards the piston during operation, whereby piston movement is transmitted to the pair of magnets; and a retainer portion disposed on the housing and confronting the shoulder portion whereby the pair of magnets, spacer, piston follower, and spring are retained within the housing.

9. The fluid flow sensor of claim 8, wherein the piston follower includes first and second diameters.

10. The fluid flow sensor of claim 8, wherein a portion of the piston follower extends from the housing.

11. The fluid flow sensor of claim 8, wherein the retainer portion is a separate part from the housing.

12. The fluid flow sensor of claim 8, wherein the spacer comprises a non-magnetic material.

13. A fluid flow monitoring and evaluation system suitable for measuring low volume, high pressure fluid flow, comprising:

A. one or more fluid flow dispensing valves each including a piston and operated by the pressure of fluid being dispensed;

B. one or more fluid flow sensors, each associated with one of the one or more fluid flow dispensing valves for measuring the fluid flow through the corresponding dispensing valve, the one or more fluid flow sensors comprising:

i. a housing including an externally threaded portion mateable with the dispensing valve;

ii. a magnet assembly slidably positioned within the housing, wherein the magnet assembly comprises:

a first magnet have a first north pole and a first south pole opposite the first north pole a second magnet having a second north pole and a second south pole opposite the second north pole; and a non-magnetic spacer between the first and second magnets wherein the first and second magnets are oriented such that:

when the first north pole is located proximal to the non-magnetic spacer and the first south pole is located distal to the non-magnetic spacer, the second south pole is located proximal to the non-magnetic spacer and the second north pole is located distal to the spacer, or when or the first south pole is located proximal to the non-magnetic spacer and the second north pole is located distal to the non-magnetic spacer, the second north pole is located proximal to the non-magnetic spacer and the second south pole is located distal to the non-magnetic spacer;

iii. a piston follower coupled to the magnet assembly and comprising a shoulder portion slidably positioned within the housing;

iv. a spring positioned within the housing and operative to bias the magnet assembly and piston follower towards the piston during operation, whereby piston movement is transmitted to the magnet assembly; and v. a retainer portion disposed on the housing and confronting the shoulder portion whereby the magnet assembly, piston follower, and spring are retained within the housing; and C. one or more fluid flow monitors, each including a microprocessor programmed to accept cycle signals from one or more of the fluid flow sensors and convert the cycle signals to fluid flow information, one or more of the fluid flow monitors including a communication link capable of sending fluid flow information to a computer.

14. The fluid flow monitoring and evaluation system of claim 13, wherein the piston follower includes first and second diameters.

15. The fluid flow monitoring and evaluation system of claim 13, wherein a portion of the piston follower extends from the housing.

16. The fluid flow monitoring and evaluation system of claim 13, wherein the piston follower is a separate part from the magnet assembly.

17. The fluid flow monitoring and evaluation system of claim 13, wherein the retainer portion is separate part from the housing.

18. The fluid flow monitoring and evaluation system of claim 13, further comprising a spacer disposed between the magnet assembly and the spring.

19. The fluid flow monitoring and evaluation system of claim 18, wherein the spring has an inside diameter and wherein a portion of the spacer extends into the inside diameter of the spring.

* * * * *